United States Patent
Lim et al.

(10) Patent No.: US 11,570,428 B2
(45) Date of Patent: Jan. 31, 2023

(54) INTRA PREDICTION MODE ENCODING/DECODING METHOD AND DEVICE, AND RECORDING MEDIUM IN WHICH BITSTREAM IS STORED

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/278,158

(22) PCT Filed: Sep. 19, 2019

(86) PCT No.: PCT/KR2019/012170
§ 371 (c)(1),
(2) Date: Mar. 19, 2021

(87) PCT Pub. No.: WO2020/060242
PCT Pub. Date: Mar. 26, 2020

(65) Prior Publication Data
US 2021/0352273 A1    Nov. 11, 2021

(30) Foreign Application Priority Data

Sep. 19, 2018 (KR) .................. 10-2018-0112076

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/196* (2014.11)

(58) Field of Classification Search
CPC .. H04N 19/105; H04N 19/132; H04N 19/159; H04N 19/176; H04N 19/196
(Continued)

(56) References Cited

U.S. PATENT DOCUMENTS

2020/0021851 A1* 1/2020 Zhao ...................... H04N 19/11
2021/0185326 A1* 6/2021 Wang .................. H04N 19/105
(Continued)

FOREIGN PATENT DOCUMENTS

JP     2014526853 A  * 10/2014  .......... H04N 19/105
KR  1020160037873 A     4/2016
(Continued)

OTHER PUBLICATIONS

Ahn, English translation of WO 2019164306 A1, Feb. 2018 (Year: 2018).*
(Continued)

*Primary Examiner* — Albert Kir
(74) *Attorney, Agent, or Firm* — William Park & Associates Ltd.

(57) ABSTRACT

There is provided a method and apparatus of encoding/decoding an intra prediction mode. The method comprises deriving an intra prediction mode with respect to a current block, constructing a reference sample for the current block on the basis of the derived intra prediction mode, and performing the intra prediction with respect to the current block using the derived intra prediction mode and the constructed reference sample, wherein the intra prediction mode is derived on the basis of a most probable mode (MPM).

8 Claims, 14 Drawing Sheets

(51) Int. Cl.
*H04N 19/132* (2014.01)
*H04N 19/159* (2014.01)
*H04N 19/196* (2014.01)

(58) Field of Classification Search
USPC .................................................. 375/240.02
See application file for complete search history.

(56) References Cited

U.S. PATENT DOCUMENTS

2021/0211709 A1* 7/2021 Zhang ................... H04N 19/52
2022/0159239 A1* 5/2022 Choi ..................... H04N 19/105
2022/0248009 A1* 8/2022 Xu .......................... H04N 19/11

FOREIGN PATENT DOCUMENTS

| KR | 1020170116850 A | 10/2017 | |
|----|-----------------|---------|---|
| KR | 1020180046876 A | 5/2018 | |
| KR | 1020180061069 A | 6/2018 | |
| WO | WO-2019164306 A1 * | 8/2019 | ........... H04N 19/105 |

OTHER PUBLICATIONS

Park, English translation of JP 2014526853 A, Oct. 2014 (Year: 2014).*

Geert Van Der Auwera et al, CE3: Summary Report on Intra Prediction and Mode Coding, Joint Video Experts Team (JVET) of ITU-T SG 16 WP 3 and ISO/IEC JTC 1/SC 29/WG 11, JVET-K0023-v3, 11th Meeting: Ljubljana, SI, Jul. 10-18, 2018, CE3 coordinators.

* cited by examiner (a)  (b)

INTRA PREDICTION MODE ENCODING/DECODING METHOD AND DEVICE, AND RECORDING MEDIUM IN WHICH BITSTREAM IS STORED

TECHNICAL FIELD

The present invention relates to a method of and an apparatus for encoding/decoding a picture, and a recording medium on which a bitstream is stored and, more particularly, to a method of and an apparatus for encoding/decoding a picture on the basis of intra prediction, and a recording medium on which a bitstream is stored.

BACKGROUND ART

In various application fields, there is an increasing demand for high-definition high-quality pictures, such as a high-definition (HD) picture and an ultra-high-definition (UHD) picture. As picture data is of higher definition and higher quality, the amount of data is relatively increased compared with existing picture data. Because of this, in a case where the picture data is transferred using a medium such as an existing wired and wireless broadband line or is stored using an existing storage medium, transfer cost and a storage cost increase. In order to solve these problems that occur due to the picture data being of high definition and of high quality, technologies for encoding/decoding a higher-definition and higher-quality picture with high efficiency are required.

Picture compression technologies include various technologies, such as an inter prediction technology that predicts a pixel value included in a current picture from a pixel value included in a picture that precedes or follows the current picture, an intra prediction technology that predicts a pixel value included in a current picture using pixel information within the current picture, a transform and quantization technology for compressing energy of a residual signal, and an entropy encoding technology that allocates a short code to a value having a high frequency of occurrence and allocates a long code to a value having a low frequency of occurrence. The picture data can be effectively compressed for transfer or storage, using these picture compression technologies.

In the related art, the form of a current block is not considered when encoding/decoding is performed using an intra prediction mode. This imposes a limitation on an improvement in the efficiency of encoding.

DISCLOSURE

Technical Problem

An object of the present invention is to provide an image encoding/decoding method and apparatus capable of improving the efficiency of image encoding/decoding.

Another object of the present invention is to provide an image encoding/decoding method and apparatus for encoding/decoding an intra prediction mode according to the form of a current block in order to improve the efficiency of image encoding/decoding.

Still another object of the present invention is to provide a recording medium on which a bitstream generated by for an image encoding/decoding method and apparatus according to the present invention is stored.

Technical Solution

According to the present invention, there is provided an method of decoding an intra prediction mode, the method comprising: deriving an intra prediction mode with respect to a current block; constructing a reference sample for the current block on the basis of the derived intra prediction mode; and performing the intra prediction with respect to the current block using the derived intra prediction mode and the constructed reference sample, wherein the intra prediction mode is derived on the basis of a most probable mode (MPM) list.

According to one embodiment, the MPM list includes at least one of an intra prediction mode of a neighboring block, a mode that results from adding a given value to the intra prediction mode of the neighboring block, and a mode that results from subtracting a given value from the intra prediction mode of the neighboring block.

According to one embodiment the neighboring block is at least one of a block adjacent to a left side of the current block and a block adjacent to an upper side thereof.

According to one embodiment, in a case where a size of the current block is W×H, the block adjacent to the upper side of the current block is a block to which a [W−1, −1] sample belongs.

According to one embodiment, in a case where a size of the current block is W×H, a block adjacent to a left side of the current block is a block to which a [−1, H−1] sample belongs.

According to one embodiment, the given value is at least one of −1, +1, −2, and +2.

According to one embodiment, the MPM list is constructed with five intra prediction mode candidates.

According to one embodiment, in the case where at least one of an intra prediction mode of a block adjacent to a left side of the current block and an intra prediction mode of a block adjacent to an upper side of the current block is a directional mode, the MPM list is constructed with a mode other than a DC mode.

According to one embodiment, in a case where the intra prediction mode of the block adjacent to the left side of the current block and the intra prediction mode of the block adjacent to the upper side of the current block are the same, and where the intra prediction mode of the block adjacent to the left side of the current block is greater than 1, the MPM list is constructed with a first intra prediction mode of the block adjacent to the left side of the current block, a mode that is (the first intra prediction mode−1), a mode that is (the first intra prediction mode+1), a mode that is (the first intra prediction mode−2), and a mode that is (the first intra prediction mode+2).

According to one embodiment, in a case where the intra prediction mode with respect to the current block is a directional intra prediction mode and were a reference sample corresponding to the intra prediction mode is present at an integer position, reference sample filtering is performed without an interpolation filter being applied to the reference sample.

Also, according to the present invention, there is provided a method of encoding an intra prediction mode, the method comprising: constructing a reference sample for a current block; performing intra prediction with respect to the current block using the constructed reference sample; and encoding an intra prediction mode with respect to the current block, wherein the intra prediction mode is encoded using a most probable mode (MPM) list.

According to one embodiment, the MPM list includes at least one of an intra prediction mode of a neighboring block, a mode that results from adding a given value to the intra prediction mode of the neighboring block, and a mode that results from subtracting a given value from the intra prediction mode of the neighboring block.

According to one embodiment, the neighboring block is at least one of a block adjacent to a left side of the current block and a block adjacent to an upper side thereof.

According to one embodiment, in a case where a size of the current block is W×H, the block adjacent to the upper side of the current block is a block to which a [W−1, −1] sample belongs.

According to one embodiment, in a case where a size of the current block is W×H, a block adjacent to a left side of the current block is a block to which a [−1, H−1] sample belongs.

According to one embodiment, the given value is at least one of −1, +1, −2, and +2.

According to one embodiment, the MPM list is constructed with five intra prediction mode candidates.

According to one embodiment, in the case where at least one of an intra prediction mode of a block adjacent to a left side of the current block and an intra prediction mode of a block adjacent to an upper side of the current block is a directional mode, the MPM list is constructed with a mode other than a DC mode.

According to one embodiment, in a case where the intra prediction mode of the block adjacent to the left side of the current block and the intra prediction mode of the block adjacent to the upper side of the current block are the same, and where the intra prediction mode of the block adjacent to the left side of the current block is greater than 1, the MPM list is constructed with a first intra prediction mode of the block adjacent to the left side of the current block, a mode that is (the first intra prediction mode−1), a mode that is (the first intra prediction mode+1), a mode that is (the first intra prediction mode−2), and a mode that is (the first intra prediction mode+2).

Also, according to the present invention, there is provided a computer-readable non-transitory recording medium on which picture data that is used in a method of decoding an intra prediction mode is stored, the picture data including information on a most probable mode (MPM) list, wherein in the method of decoding an intra prediction mode, information on the MPM list is used to derive an MPM list, the MPM list is used to derive an intra prediction mode with respect to a current block, the derived intra prediction mode is used to construct a reference sample for the current block, and the derived intra prediction mode and the constructed reference sample are used to perform intra prediction with respect to the current block.

Advantageous Effects

According to the present invention, there is provided an image encoding/decoding method and apparatus capable of improving the efficiency of picture encoding/decoding.

In addition, according to the present invention, there is provided an image encoding/decoding method and apparatus for encoding/decoding an intra prediction mode according to the form of a current block in order to improve the efficiency of picture encoding/decoding.

In addition, according to the present invention, there is provided a recording medium on which a bitstream generated by an image encoding/decoding method and apparatus according to the present invention is stored.

BEST MODE

Figure 1:
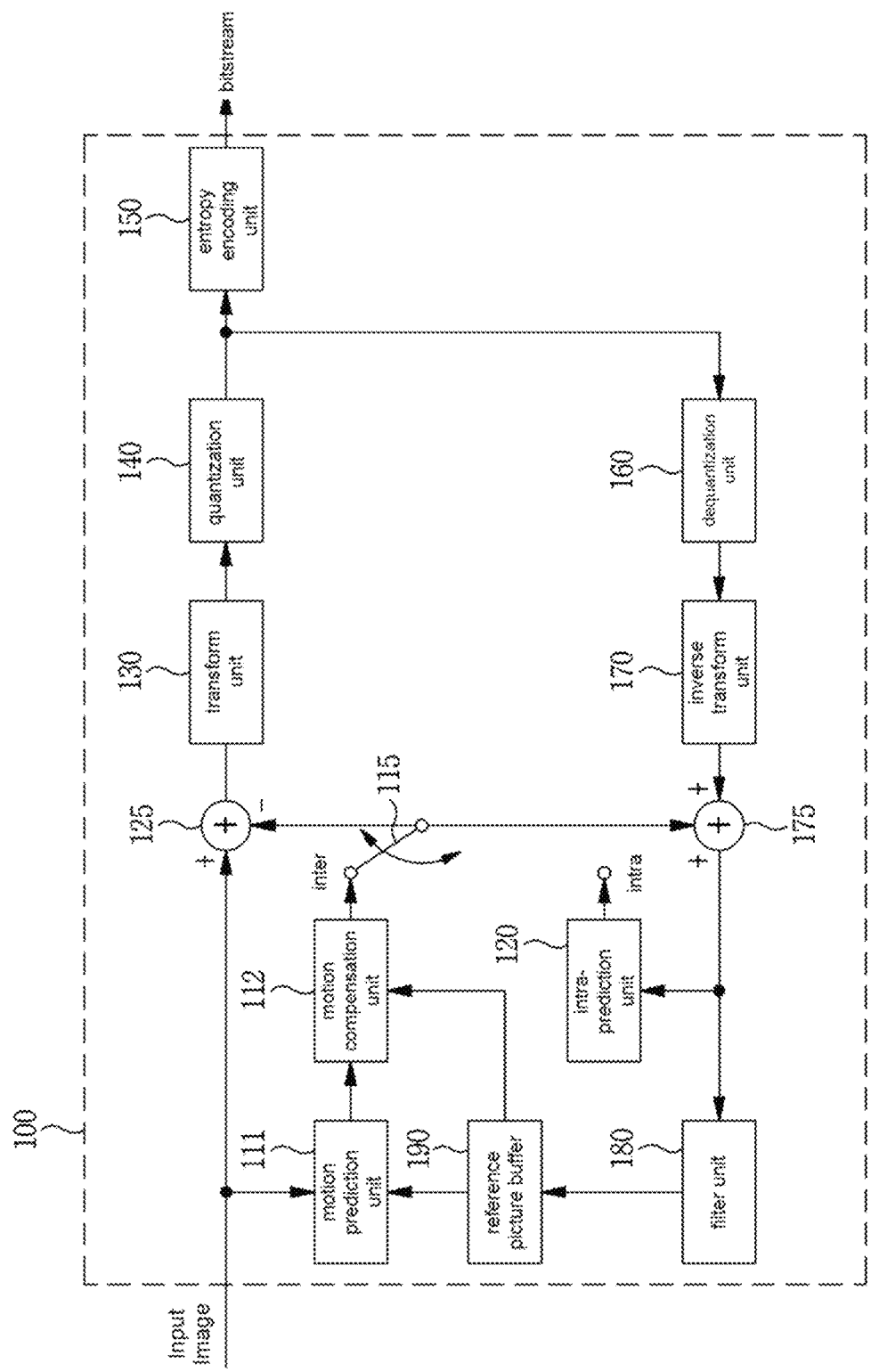
FIG. 1 is a block diagram illustrating a configuration of an encoding apparatus according to an embodiment of the present invention.

An adaptation parameter set may mean a parameter set that can be shared by being referred to in different pictures, subpictures, slices, tile groups, tiles, or bricks. In addition, intra adaptation parameter set information may be used by referring to different adaptation parameter sets in an intra picture subpicture, a slice, a tile group, a tile, or a brick.

In addition, regarding the adaptation parameter set, different adaptation parameter sets may be referred to by using identifiers of different adaptation parameter sets in a intra picture subpicture, a slice, a tile group, a tile, or a brick.

In addition, regarding the adaptation parameter set, different adaptation parameter sets may be referred to by using identifiers of different adaptation parameter sets in an intra subpicture slice, a tile group, a tile, or a brick.

In addition, regarding the adaptation parameter set, different adaptation parameter sets may be referred to by using identifiers of different adaptation parameter sets in an intra slice tile or a brick.

In addition, regarding the adaptation parameter set different adaptation parameter sets may be referred to by using identifiers of different adaptation parameter sets in an intra tile brick.

Information on an adaptation parameter set identifier may be included in a parameter set or a header of the subpicture, and an adaptation parameter set corresponding to the adaptation parameter set identifier may be used in the subpicture.

The information on the adaptation parameter set identifier may be included in a parameter set or a header of the tile, and an adaptation parameter set corresponding to the adaptation parameter set identifier may be used in the tile.

The information on the adaptation parameter set identifier may be included in a header of the brick, and an adaptation parameter set corresponding to the adaptation parameter set identifier may be used in the brick.

The picture may be partitioned into one or more tile rows and one or more tile columns.

The subpicture may be partitioned into one or more tile rows and one or more tile columns within a picture.

The subpicture may be a region having the form of a rectangle/square within a picture and may include one or more CTUs.

In addition, at least one or more tiles/bricks/slices may be included within one subpicture.

The tile may be a region having the form of a rectangle/square and may include one or more CTUs. In addition, the tile may be partitioned into one or more bricks.

The brick may mean one or more CTU rows within a tile. The tile may be partitioned into one or more bricks, and each brick may have at least one or more CTU rows. The tile that cannot be partitioned into two or more bricks may mean a brick.

The slice may include one or more tiles within a picture and may include one or more bricks within a tile.

Parsing: may mean determination of a value of a syntax element by performing entropy decoding or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here. M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate ma include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter, may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder bit is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode(direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an inter-polation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample is offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. Tat is, a reference image is a reconstructed image composed of reconstructed blocks processed by the filter unit 180. The stored reference image may be used later in inter prediction or motion compensation.

Figure 2:
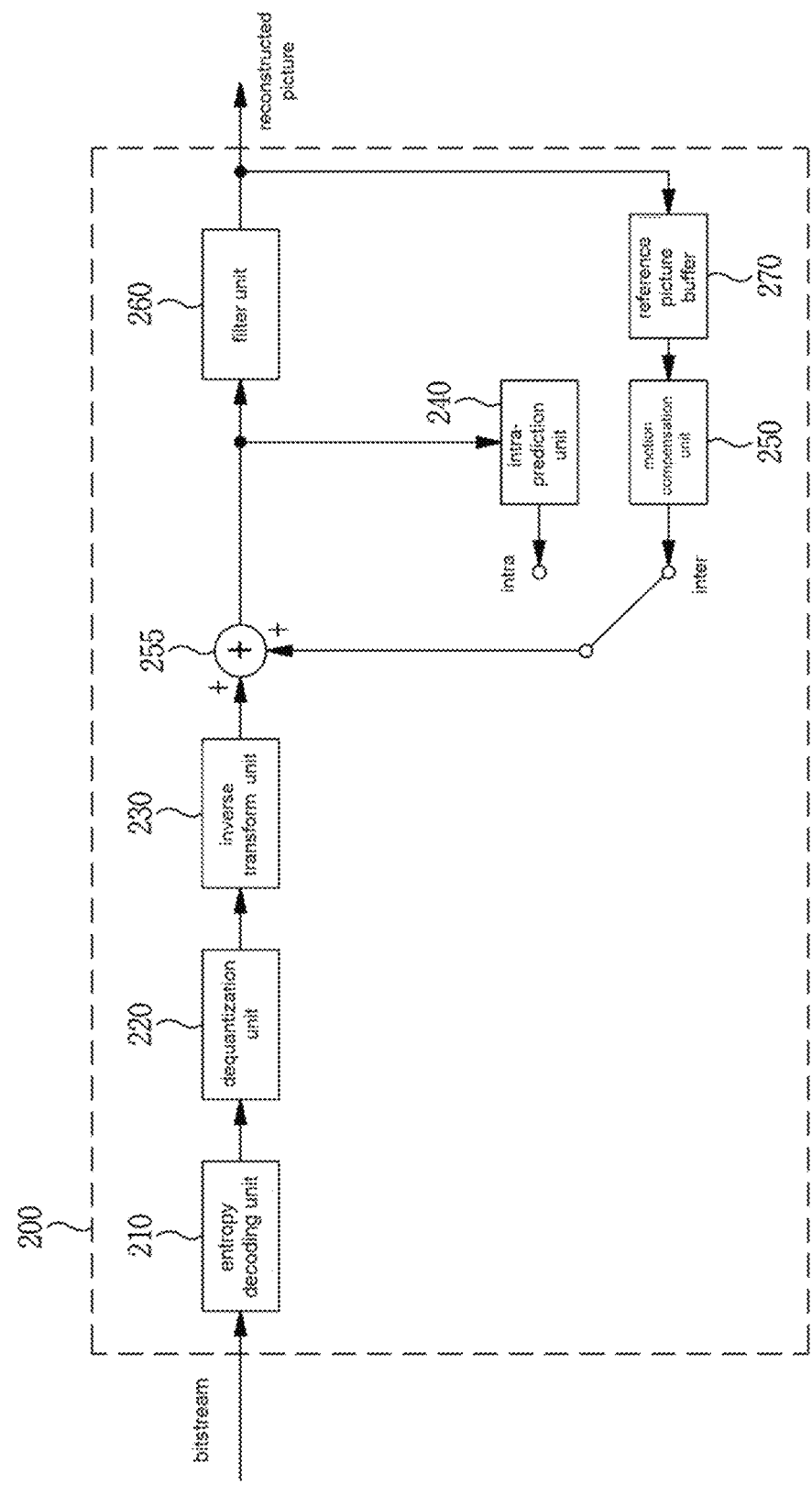
FIG. 2 is a block diagram illustrating a configuration of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
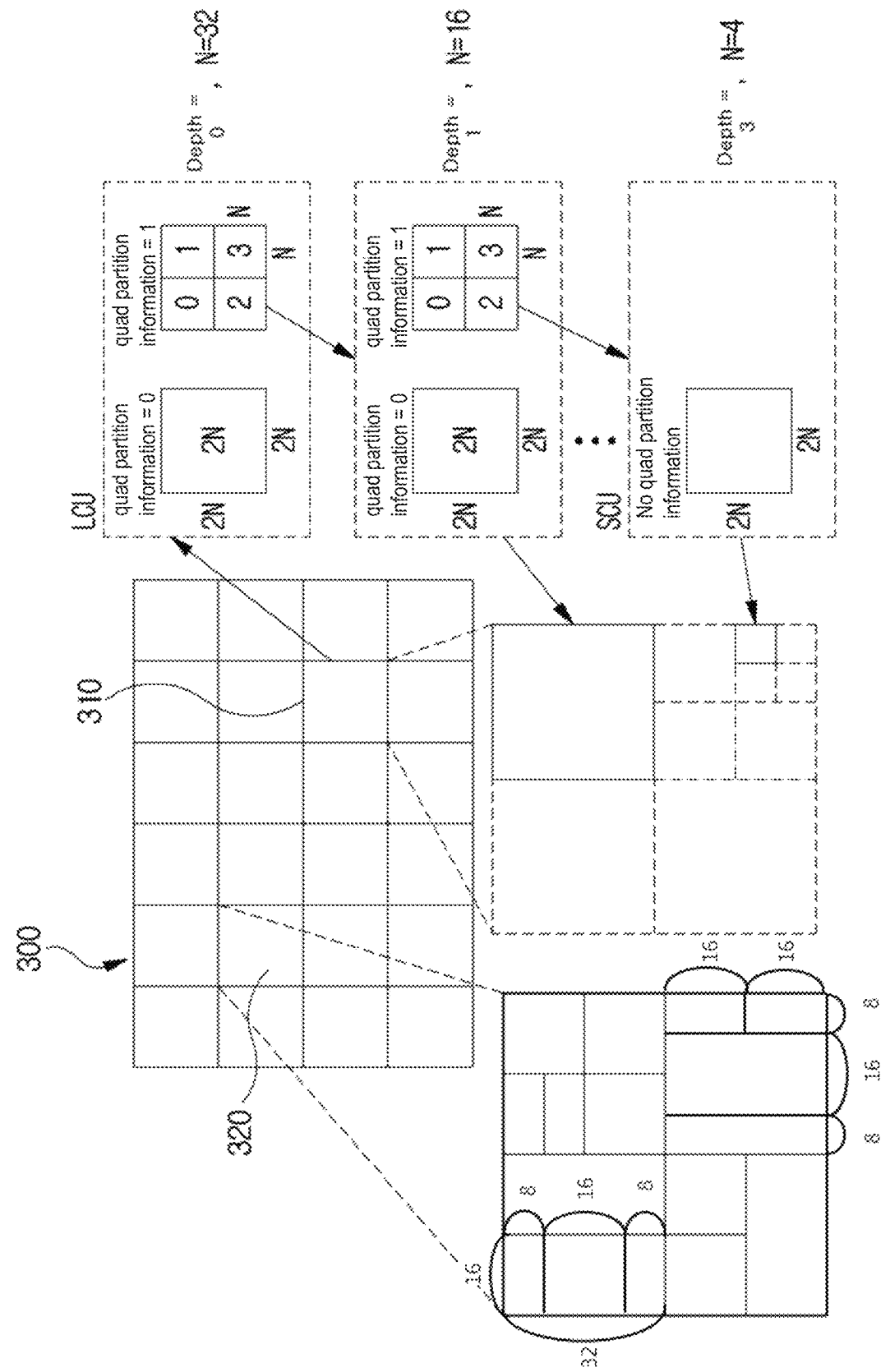
FIG. 3 is a diagram schematically illustrating a partitioning structure that is present when encoding/decoding a picture.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 3232 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g. "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to anode of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning ma not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled bit may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
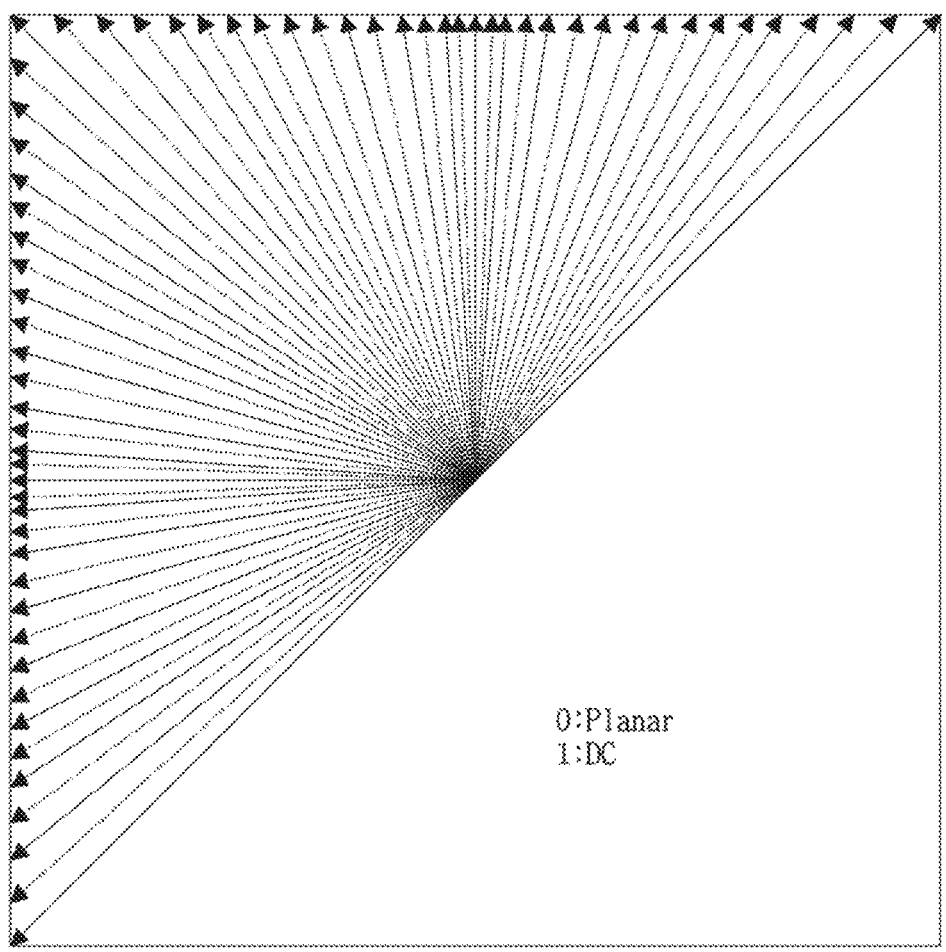
FIG. 4 is a diagram for describing an intra prediction process according to an embodiment.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU. PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
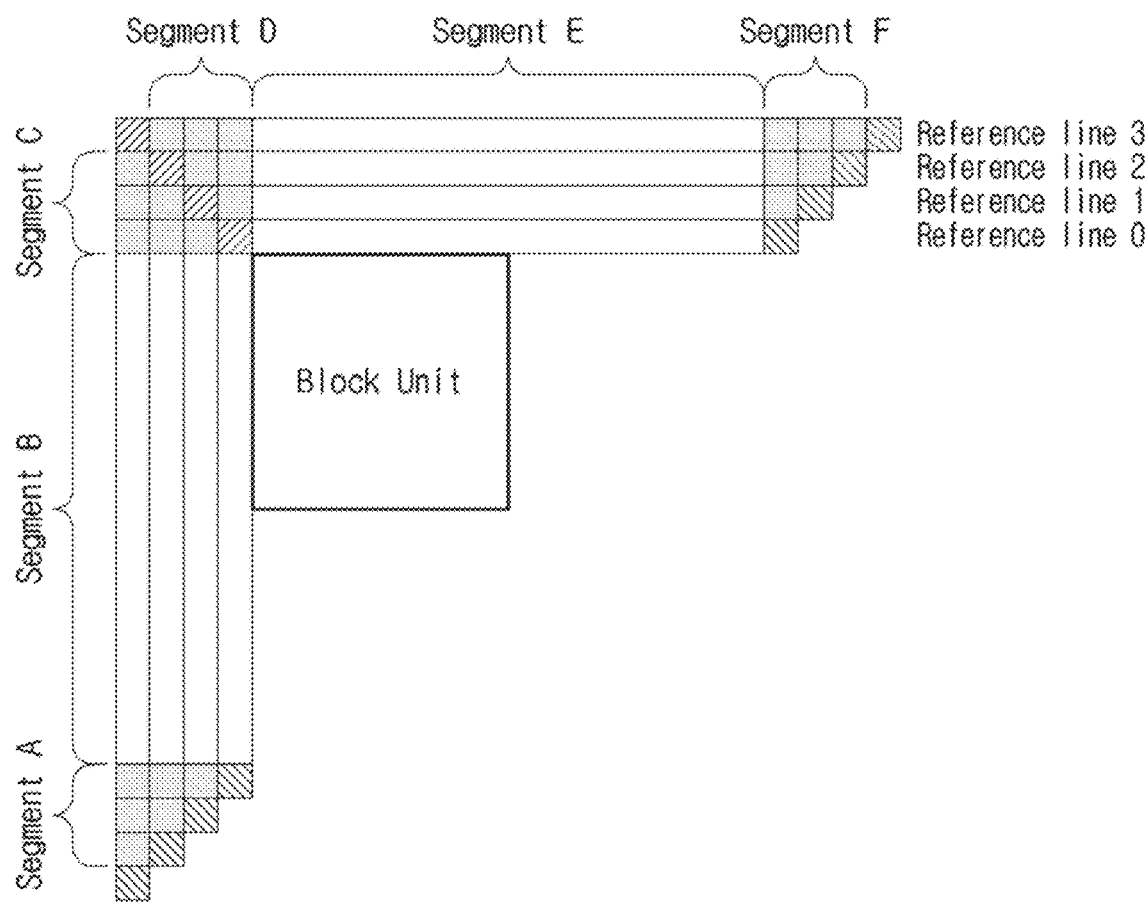
FIG. 7 is a diagram for describing reference samples that are available for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
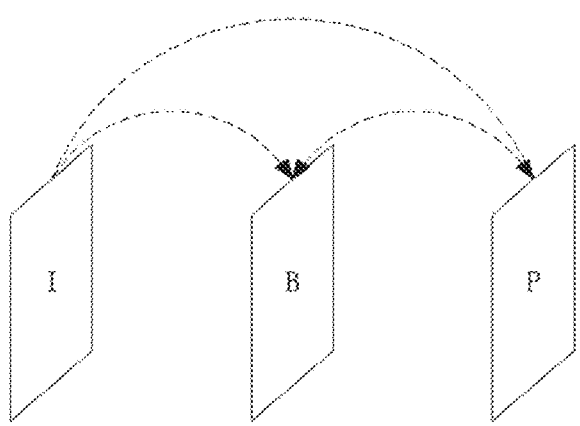
FIG. 5 is a diagram for describing the intra prediction process according to the embodiment.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 ma compensate a prediction sample derived via inter prediction using an optical flow.

Figure 6:
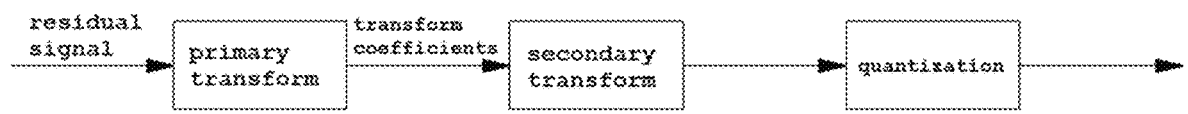
FIG. 6 is a diagram for describing a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e. an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loeve transform (KLT). The transform coefficients generated through the primary transform may undergo the secondary transform. The transform schemes used for the primary transform and/or the secondary transform may be determined according to coding parameters of the current block and for neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

A method of encoding/decoding an intra prediction mode according to the present disclosure may include a step of deriving an intra prediction mode, a step of constructing a reference sample, and/or a step of performing intra prediction.

The step of deriving an intra prediction mode will be described below.

A method of and an apparatus for encoding/decoding an intra prediction mode according to the present disclosure may derive an intra prediction mode of a current block using at least one of a method of performing derivation using an intra prediction mode of a neighboring block, a method of performing derivation using a most probable mode (MPM), a method of performing derivation by entropy-encoding/decoding an intra prediction mode of a current block, a method of using an inter-color-component intra prediction mode, and a method of preforming derivation on a per-subblock basis.

The neighboring block here is one or more blocks that are restored before encoding/decoding the current block. That is, the neighboring block may mean a block adjacent to a boundary, an edge, a vertex, or the like of the current block. In a case where the neighboring block is positioned outside a given unit boundary of at least one of a picture, a slice, a tile, a coding tree unit (CTU) or corresponds to an inter encoding/decoding block, and thus is unavailable, an intra prediction mode corresponding to the neighboring block may be replaced with a DC mode, a planar mode, or a given intra prediction mode.

At this point, the size of the current block may be W×H where W and H are positive integers, and, for example, each is at least one of 2, 4, 8, 16, 32, 64, 128, 256, and 512.

Figure 8:
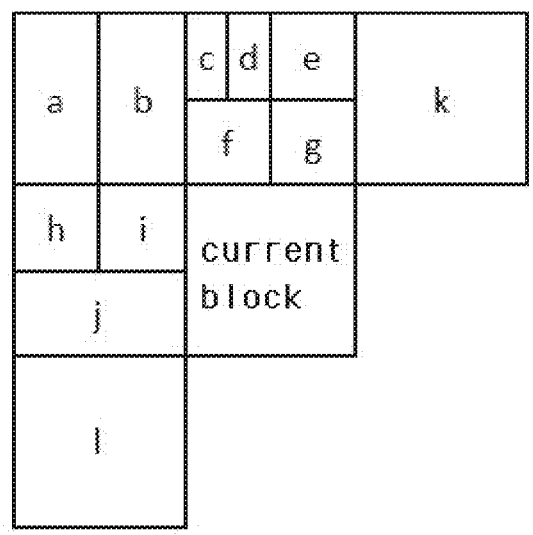
FIG. 8 is a diagram illustrating a neighboring block that is used to derive an intra prediction mode of a current block according to an embodiment of the present invention.

FIG. 8 illustrates a neighboring block that is used to derive the intra prediction mode of the current block according to an embodiment of the present invention.

As illustrated in an example in FIG. 8, in a case where a neighboring block is present and where a number indicating an intra prediction mode or a mode is "a" to "k", the intra prediction mode of the current block may be derived using at least one or more of methods that will be described below. At this time, a position of the neighboring block may be fixed as a pre-defined position. Alternatively, information on the position of the neighboring block may be encoded/decoded, and thus the position of the neighboring block may be derived. The "encoding/decoding" may hereinafter mean "entropy encoding and decoding".

On the other hand, the pre-defined position may be derived using a horizontal and/or a vertical length of the current block.

A method of using the intra prediction mode of the neighboring block will be described below.

A given mode of the neighboring block may be derived as the intra prediction mode of the current block. For example, for the derivation, the following methods may be used.

As an example, an intra prediction mode "i" of a block to which a [−1, 0] sample present on the left side of a [0, 0] sample of the current block belongs may be derived as the intra prediction mode of the current block.

As another example, an intra prediction mode "f" of a block to which a [0, −1] sample present on the top side of the [0, 0] sample of the current block belongs may be derived as the intra prediction mode of the current block.

As still another example, an intra prediction mode "b" of a block to which a [−1, −1] sample that is present, to the left side, above the top side of the [0, 0] sample of the current block belongs may be derived as the intra prediction mode of the current block.

As still another example, an intra prediction mode "g" of a block to which a [W−1, −1] 1 sample present on the top side of a [W−1, 0] sample of the current block belongs may be derived as the intra prediction mode of the current block.

As still another example, an intra prediction mode "k" of a block to which a [W, −1] sample that is present, to the right side, above the top side of the [W−1, 0] sample of the current block belongs may be derived as the intra prediction mode of the current block.

As still another example, an intra prediction mode "j" of a block to which a [−1, H−1] sample present on the left side of a [0, H−1] sample of the current block belongs may be derived as the intra prediction mode of the current block.

As still another example, an intra prediction mode "l" of a block to which a [−1, H] sample that is present, to the left side, below the [0, H−1] sample of the current block belongs may be derived as the intra prediction mode of the current block.

As still another example, in a case where multiple intra prediction modes of the neighboring block are used, a statistical value of the intra prediction modes of the neighboring block may be derived as the intra prediction mode of the current block. The statistical value may be at least one or more of a mean value, a weighted average value, a minimum value, a maximum value, a mode, a median value, and an interpolation value. At this time, the neighboring blocks may be selected on the basis of information that is signaled explicitly through a bitstream. Alternatively, the selection may be made according to a reference that is pre-set in an encoder and a decoder.

In a case where one or more intra prediction modes of the neighboring block are non-directional intra prediction modes, the non-directional intra prediction mode may be derived as the intra prediction mode of the current block. Alternatively, the intra prediction mode of the current block may be derived using the intra prediction mode of the neighboring block other than the non-directional intra prediction mode.

In a case where all the intra prediction mode of the neighboring blocks are the non-directional intra prediction modes, the intra prediction mode of the current block may be derived as at least one of the DC mode and the planar mode.

The intra prediction mode of the current block may be derived by combining one or more intra prediction modes of the neighboring blocks. At this time, the intra prediction mode may be expressed as at least one or more of a mode number, a mode value, and a mode angle.

As one example, an average value of one or more intra prediction modes of the neighboring block may be derived as the intra prediction mode of the current block. At this time, an average of two intra prediction modes may mean at least one of a middle number of two mode numbers, a middle value of two mode values, and a middle angle, which is a difference between two mode angles.

As another example, the intra prediction mode of the current block may be derived through the use of a weighted sum of one or more intra prediction modes of the neighboring block. For example, the intra prediction mode of the current block may be derived with the weighted sum that results from assigning a weighting factor on the basis of a size of the neighboring block.

The intra prediction mode of the current block may be derived using at least one or more of coding parameters of the neighboring block and/or at least one or more of coding parameters of the current block.

At least one or more of the coding parameters of the neighboring block and at least one or more of the coding parameters of the current block may be compared, and thus the intra prediction mode of the neighboring block may be derived as the intra prediction mode of the current block.

A method of using the most probable mode (MPM) will be described below.

The intra prediction mode of the current block may be derived using the MPM. At this time, the intra prediction mode of the current block may be derived by entropy-encoding/decoding one or more pieces of information on intra prediction.

An MPM list may be constructed using the MPM, and a candidate mode that is to be included in the MPM list may be constructed on the basis of the intra prediction mode of the neighboring block. At this time, the neighboring block may be at least one of blocks that are positioned on the upper side, the left side, the left upper side, the left lower side, the right upper side of the current block. The number of candidate modes that are included in the MPM list may be N that is a given positive integer. The number of MPM candidate modes may differ according to a size/form of a block. At this point, N is a positive integer and may be 5 or 6.

Intra prediction modes of the current block that are derived using intra prediction modes of one or more neighboring blocks may be candidate modes that are to be included in the MPM list.

As an example, as illustrated in the example in FIG. 8, the intra prediction modes of the blocks that are positioned on the samples [−1, H−1], [W−1, −1], [W, −1], [−1, H], and [−1, −1] which are adjacent to the current block, may be used, and thus the modes "j", "g", planar, DC, "l", "k", and "b" may be candidate modes and be included, sequentially in this order, in the MPM list. At this time, in a case where overlapping modes occur and where the list is thus not fully filled, at least one or more modes of a +1 mode, a −1 mode, a horizontal mode, a vertical mode, a 45-degree mode, a 135-degree mode, and a 225-degree mode, which are modes that are included in the list, may be added to fill up the MPM list. At this time, in the case where overlapping modes occur and where the list is not fully filled, at least one or more modes of the +1 mode, the −1 mode, the horizontal mode, the vertical mode, the 45-degree mode, the 135-degree mode, and the 225-degree mode, which are modes that are present in the list may be added.

An indicator (prev_intra_lwna_pred_flag) that indicates whether or not a mode that is the same as the intra prediction mode of the current block is present in the derived MPM list may be encoded/decoded.

As an example, in a case where the indicator indicates that the same mode is present in the MPM list, an index information (mpm_idx) that indicates which one of the modes included in the MPM list is the same as the intra prediction mode of the current block may be encoded/decoded, and thus the intra prediction mode of the current block may be derived.

As another example, in a case where the indicator indicates that the same mode is not present in the MPM list, the intra prediction mode of the current block may be encoded/decoded, and thus the intra prediction mode of the current block may be derived. At this time, intra prediction modes that are not included in the MPM list may be aligned at least in ascending order or in descending order.

As still another example, in a case where the indicator indicates that the mode that is the same as the intra prediction mode of the current block is not present in the MPM list, a secondary MPM list may be constructed for one or more intra prediction modes, and the intra prediction mode of the current block may be derived using index information (2nd_mpm_idx) that indicates which mode of the modes included in the secondary MPM list is the same as the intra prediction mode of the current block.

As still another example, in a case where the indicator indicates that the mode that is the same as the intra prediction mode of the current block is not present in the MPM list and/or the secondary MPM list, the intra prediction mode of the current block may be encoded/decoded using a remaining intra prediction mode index (rem_intra_luma_pred_mode).

An intra prediction mode of a chroma component may be derived using at least one or both of an intra chroma-component prediction mode index (intra_chroma_pred_mode) and/or an intra prediction mode of a corresponding luma block.

At least one of the intra prediction mode of the neighboring block, an intra prediction mode that results from adding or subtracting a specific value to and from the intra prediction mode of the neighboring block, and a basic intra prediction mode may be added to the MPM list. The adding of the intra prediction mode to the MPM list may mean the including of the intra prediction mode in the MPM list.

The intra prediction mode of the neighboring block may mean at least one of intra prediction modes of blocks adjacent to the current block.

As an example, the intra prediction mode of the neighboring block may mean at least one of intra prediction modes of blocks adjacent to the left side and the upper side, respectively, of the current block.

As another example, the intra prediction mode of the neighboring block may mean an intra prediction mode of a block present at a pre-defined position with respect to the current block.

The specific value may be at least one of 0, a positive integer, and a negative integer. The specific value may be decided on the basis of at least one of the coding parameters of the current block. In addition, the specific value may be a value that is pre-set in the encoder/decoder and may be a value that is signaled from the encoder to the decoder.

As an example, the specific value may be −1, +1, −2, +2, −3, +3, −4, +4, −5, +5, and so on.

As another example, the specific value may be at least one of values selected from a group consisting of absolute values that are expressed as integer values.

As still another example, the specific value may be at least one of values selected from a group consisting of absolute values that are expressed as odd-number integer values.

As still another example, the specific value may be at least one of values selected from a group consisting of absolute values that are expressed as even number integer values.

As still another example, the specific value that is subtracted may be derived using the specific value that is added. Alternatively, the specific value that is added may be derived using the specific value that is subtracted.

The intra prediction mode of the neighboring block, or the intra prediction mode that results from adding or subtracting a specific value to and from the intra prediction mode of the neighboring block may be added to the MPM list.

The adding of the intra prediction mode to the MPM list may mean the including of the intra prediction mode in the MPM list.

According to an embodiment in which 5 MPM candidate modes are used, the MPM candidate mode may be constructed using the following process. The MPM candidate mode may mean the intra prediction mode that is included in the MPM list.

For example, in a case where at least one of an intra prediction mode of a left side neighboring block and an intra prediction mode of an upper side neighboring block is a directional mode, the MPM list may be constructed in such a manner that the DC mode is not included as the MPM candidate mode.

Specifically,

1) In a case where the intra prediction mode of the left side neighboring block and the intra prediction mode of the upper side neighboring block are the same and where the intra prediction mode of the left side neighboring block is greater than 1 (that is, in a case where the intra prediction mode of the left side neighboring block is a directional mode or in a case where the intra prediction mode of the left side neighboring block is neither a DC mode nor a planar mode), The MPM list may be constructed with {intra prediction mode of left side neighboring block, (2+(intra prediction mode value of left side neighboring block+61)% 64), (2+(intra prediction mode value of left side neighboring block−1)% 64), (2+(intra prediction mode value of left side neighboring block+60)% 64), (2+(intra prediction mode value of left side neighboring block %64))}.

2) In a case where the intra prediction mode of the left side neighboring block and the intra prediction mode of the upper side neighboring block are not the same and where the intra prediction mode of the left side neighboring block or the intra prediction mode of the upper side neighboring block is greater than 1, the intra prediction mode of the left side neighboring block and the intra prediction mode of the upper side neighboring block may be compared, and thus a minimum value and a maximum value may each be obtained.

2-1) Under the condition in 2), in a case where the intra prediction mode of the left side neighboring block and the intra prediction mode of the upper side neighboring block is greater than 1, the MPM list may include {intra prediction mode of left side neighboring block, intra prediction mode of upper side neighboring block}, 2-1-1) if a difference between the maximum value and the minimum value is 1, the MPM list may be constructed to further include {(2+((minimum value+61)% 64)), (2+((maximum value−1) %64)),(2+((minimum value+60)%64))}, 2-1-2) Furthermore, if the difference between the maximum value and the minimum value is equal to or greater than 62, the MPM list may be constructed to further include {(2+((minimum value−1) % 64)), (2+((maximum value+61) %64)), (2+(minimum value %64))}.

2-1-3) Furthermore, if the difference between the maximum value and the minimum value is 2, the MPM list may be constructed to further include {(2+((minimum value−1) % 64)), (2+((minimum value+61) %64)),(2+((maximum value−1)%64))}.

2-1-4) Furthermore, if the conditions in 2-1-1), 2-1-2), and 2-1-3) are not satisfied, the MPM list may be constructed to further include {(2+((minimum value+61)% 64)), (2+((minimum value−1) %64)),(2+((maximum value+61)%64))}.

2-2) Under the condition in 2), in a case where the intra prediction mode of the left side neighboring block or the intra prediction mode of the upper side neighboring block is greater than 1, the MPM list may be constructed with (maximum value, (2+((maximum value+61) % 64)), (2+((maximum value−1) % 64)), (2+((maximum value+60) % 64)), (2+(maximum value % 64))).

3) In a case where the conditions in 1) and 2) are not satisfied, the MPM list may be constructed with {DC mode, vertical mode, horizontal mode, vertical mode−4, vertical mode+4}

Information on whether or not a planer mode is used in the current block may be signaled from the encoder to the decoder using separate flag information. In a case where the current block is not in the planar mode, the MPM list may be constructed. In a case where the information on whether or not the planar is used in the current block is 0, which is a first value, the intra prediction mode with respect to the current block may be decided as the planar mode. In addition, in a case where the information on whether or not the planar is used in the current block is 1, which is a second value, according to an embodiment in which the MPM list is constructed, the MPM list for the current block may be constructed, and thus the intra prediction mode of the current block may be decided.

The basic intra prediction mode may mean at least one of a DC mode, a planar mode, a linear mode (LM), a vertical mode, a horizontal mode, a 45-degree mode, a 135-degree mode, a 225-degree mode, a first diagonal mode, and a second diagonal mode.

As an example, the basic intra prediction mode may be at least one of non-directional modes.

As another example, the basic intra prediction mode may beat least one of the vertical mode and the horizontal mode that are directional modes.

As another example, the basic intra prediction mode ma be an LM mode in a chroma block.

As still another example, an intra prediction mode value of the planar mode may be 0, a intra prediction mode value of the DC mode may be 1, an intra prediction mode value of the horizontal mode may be 18, an intra prediction mode value of the vertical mode may be 50, an intra prediction mode value of the first diagonal mode may be 34, an intra prediction mode value of the second diagonal mode may be 66, and an intra prediction mode value of the LM mode may be 67.

According to an embodiment in which three MPM candidates are used, the MPM list may be constructed using the following process. The MPM candidate mode here may mean the intra prediction mode that is included in the MPM list.

As an example, 1) in a case where the intra prediction mode of the left side neighboring block and the intra prediction mode of the upper side neighboring block are the same, the MPM list may be constructed as follows.

1-1) Under the condition in 1), in a case where the intra prediction mode of the left side neighboring block is smaller than 2 (that is, the intra prediction mode of the left side neighboring block is a DC mode or a planar mode), the MPM list may be constructed with {planar mode, DC mode, vertical mode}.

1-2) Under the condition in 1), in a case where the condition in 1-1) is not satisfied, the MPM list may be constructed with {intra prediction mode of left side neighboring block, (2+(intra prediction mode value of left side neighboring block+61) % 64), (2+(intra prediction mode value of left side neighboring block−1)% 64)}.

As another example, 2) in a case where the intra prediction mode of the left side neighboring block and the intra prediction mode of the upper side neighboring block are not the same, the MPM list may be constructed as follows.

2-1) Under the condition in 2), in a case where neither the intra prediction mode of the left side neighboring block nor the intra prediction mode of the upper side neighboring block are the planar mode, the MPM list may be constructed with (intra prediction mode of left side neighboring block, intra prediction mode of upper side neighboring block, and planar mode).

2-2) Under the condition in 2), in a case where neither the intra prediction mode of the left side neighboring block nor the intra prediction mode of the upper side neighboring block are the DC mode, the MPM list may be constructed with {intra prediction mode of left side neighboring block, intra prediction mode of upper side neighboring block, and DC mode}.

2-3) Under the condition in 2), a case where the conditions m 2-1) and 2-2) are not satisfied, the MPM list may be constructed with {intra prediction mode of left side neighboring block, intra prediction mode of upper side neighboring block, and vertical mode}.

In the embodiment described above, "2-1) under the condition in 2), in a case where neither the intra prediction mode of the left side neighboring block nor the intra prediction mode of the upper side neighboring block are the planar mode," may mean "2-1) under the condition in 2), in a case where the intra prediction mode value of the left side neighboring block and an intra prediction mode value of the upper side neighboring block are all greater than 0."

In the embodiment described above, "2-2) under the condition in 2), in a case where neither the intra prediction mode of the left side neighboring block nor the intra prediction mode of the upper side neighboring block are the DC mode," may mean "2-2) under the condition in 2), in a case where a sum of the intra prediction mode value of the left side neighboring block and the intra prediction mode of the upper side neighboring block is not smaller than 2, and may mean "2-2) under the condition in 2), the intra prediction mode of the left side neighboring block and the intra prediction mode of the upper side neighboring block are the DC mode and the planar mode, respectively, or are the planar mode and the DC mode, respectively".

In the embodiment described above, instead of the intra prediction mode of the left side neighboring block, the intra prediction mode of the upper side neighboring block may be used, and the MPM list may be constructed using the intra prediction mode of the left side neighboring block instead of the intra prediction mode of the upper side neighboring block.

In the MPM list, the intra prediction mode value of the left side neighboring block may serve as a reference. n may be subtracted from a value that is smaller than the intra prediction mode value of the left side neighboring block. In addition, n may be added to a value that is greater than the intra prediction mode value of the left side neighboring block n is not 0 and may be a positive integer.

According to another embodiment in which three MPM candidate modes, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in a case where the intra prediction mode of the left side neighboring block is smaller than 2 (that is, the intra prediction mode of the left side neighboring block is a DC mode or a planar mode), the MPM list may be constructed with {planar mode, DC mode, vertical mode}.

1-2) Under the condition in 1), in a case where the condition in 1-1) is not satisfied, the MPM list may be constructed with {intra prediction mode of left side neighboring block, (2+(intra prediction mode value of left side neighboring block+61) % 64), (2+(intra prediction mode value of left side neighboring block−1)%64)}.

As another example, 2) in a case where the intra prediction mode of the left side neighboring block and the intra prediction mode of the upper side neighboring block are not the same, the MPM list may be constructed as follows.

2-1) Under the condition in 2), in a case where a horizontal size of the current block is larger than a vertical size thereof.

2-1-1) if neither the intra prediction mode of the left side neighboring block nor the intra prediction mode of the upper side neighboring block are the planar mode, the MPM list may be constructed with {intra prediction mode of left side neighboring block, intra prediction mode of upper side neighboring block, and planar mode}.

2-1-2) Furthermore, if neither the intra prediction mode of the left side neighboring block nor the intra prediction mode of the upper side neighboring block are the DC mode, the MPM list may be constructed with {intra prediction mode of left side neighboring block, intra prediction mode of upper side neighboring block, and DC mode}.

2-1-3) Furthermore, if the conditions in 2-1-1) and 2-1-2) are not satisfied, the MPM list may be constructed with {intra prediction mode of left side neighboring block, intra prediction mode of upper side neighboring block, and vertical mode}.

2-2) Under the condition in 2), in a case where the condition in 2-1) is not satisfied, 2-2-1) if neither the intra prediction mode of the left side neighboring block nor the intra prediction mode of the upper side neighboring block are the planar mode, the MPM list may be constructed with (intra prediction mode of upper side neighboring block, intra prediction mode of left side neighboring block, planar model.

2-2-2) Furthermore, if neither the intra prediction mode of the left side neighboring block nor the intra prediction mode of the upper side neighboring block are the DC mode, the MPM list may be constructed with {intra prediction mode of upper side neighboring block, intra prediction mode of left side neighboring block. DC mode}.

2-2-3) Furthermore, if the conditions in 2-2-1) and 2-2-2) are not satisfied, the MPM list may be constructed with {intra prediction mode of upper side neighboring block, intra prediction mode of left side neighboring block, vertical mode}.

In the embodiment described above, when the intra prediction mode of the neighboring block is added to the MPM list, intra prediction modes of the neighboring block may be prioritized according to a block form of the current block and may be added according to their priority. The block form of the current block is at least one of a square and a rectangle. In addition, the horizontal size and the vertical size of the current block may be compared and thus it may be determined whether the block form of the current block is a rectangle in which the horizontal size is larger than the vertical size, or a rectangle in which the vertical size is larger than the horizontal size.

In the embodiment described above, "2-1), under the condition in 2), in a case where a horizontal size of the current block is larger than a vertical size thereof" may mean "under the condition in 2), in a case where a horizontal size of the current block is equal to or larger than a vertical size thereof"

In the MPM list, the intra prediction mode value of the left side neighboring block may serve as a reference. n may be subtracted from a value that is smaller than the intra prediction mode value of the left side neighboring block. In addition, n may be added to a value that is greater than the intra prediction mode value of the left side neighboring block. n is not 0 and may be a positive integer.

According to still another embodiment in which three MPM candidate modes are used, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in a case where the intra prediction mode of the left side neighboring block is smaller than 2 (that is, the intra prediction mode of the left side neighboring block is a DC mode or a planar mode), the MPM list may be constructed with {planar mode. DC mode, vertical mode}.

1-2) Under the condition in 1), in a case where the condition in 1-1) is not satisfied, the MPM list may be constructed with {intra prediction mode of left side neighboring block, (2+(intra prediction mode value of left side neighboring block+61) % 64), (2+(intra prediction mode value of left side neighboring block−1)% 64)}.

As another example, 2) in a case where the intra prediction mode of the left side neighboring block and the intra prediction mode of the upper side neighboring block are not the same, the MPM list may be constructed as follows.

2-1) Under the condition in 2), in a case where a horizontal size of the current block is larger than a vertical size thereof, 2-1-1) if nether the intra prediction mode of the left side neighboring block nor the intra prediction mode of the upper side neighboring block are the planar mode, the MPM list may be constructed with {intra prediction mode of upper side neighboring block, intra prediction mode of left side neighboring block, planar mode}.

2-1-2) Furthermore, if neither the intra prediction mode of the left side neighboring block nor the intra prediction mode of the upper side neighboring block are the DC mode, the MPM list may be constructed with {intra prediction mode of upper side neighboring block, intra prediction mode of left side neighboring block. DC mode).

2-1-3) Furthermore, if the conditions in 2-1-1) and 2-1-2) are not satisfied, the MPM list may be constructed with (intra prediction mode of upper side neighboring block, intra prediction mode of left side neighboring block, vertical mode}.

2-2) Under the condition in 2), in a case where the condition in 2-1) is not satisfied, 2-2-1) if neither the intra prediction mode of the left side neighboring block nor the intra prediction mode of the upper side neighboring block are the planar mode, the MPM list may be constructed with {intra prediction mode of left side neighboring block, intra prediction mode of upper side neighboring block, and planar mode}.

2-2-2) Furthermore, if neither the intra prediction mode of the left side neighboring block nor the intra prediction mode of the upper side neighboring block are the DC mode, the MPM list nay be constructed with {intra prediction mode of left side neighboring block, intra prediction mode of upper side neighboring block, and DC mode}.

2-2-3) Furthermore, if the conditions in 2-2-1) and 2-2-2) are not satisfied, the MPM list may be constructed with {intra prediction mode of left side neighboring block, intra prediction mode of upper side neighboring block, and vertical mode}.

According to the embodiment described above, an example where, when the intra prediction mode of the neighboring block is added to the MPM list, intra prediction modes of the neighboring block are prioritized according to a block form of the current block and are added according to their priority is provided.

In the embodiment described above, "2-1), under the condition in 2), in a case where a horizontal size of the current block is larger than a vertical size thereof" may mean "under the condition in 2), in a case where a horizontal size of the current block is equal to or larger than a vertical size thereof".

In the MPM list, the intra prediction mode value of the left side neighboring block may serve as a reference. n may be subtracted from a value that is smaller than the intra prediction mode value of the left side neighboring block. In addition, n may be added to a value that is greater than the intra prediction mode value of the left side neighboring block n is not 0 and may be a positive integer.

According to still another embodiment in which three MPM candidate modes are used, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in the case where the intra prediction mode of the left side neighboring block is smaller than 2 (that is, the intra prediction mode of the left side neighboring block is the DC mode or the planar mode), 1-1-1) if the horizontal size of the current block is larger than the vertical size thereof, the MPM list may be constructed with {planar mode, DC mode, horizontal mode}.

1-1-2) Furthermore, if the condition in 1-1-1) is not satisfied, the MPM list may be constructed with {planar mode, DC mode, vertical mode}.

1-2) Under the condition in 1) in a case where the condition in 1-1) is not satisfied, the MPM list may be constructed with {intra prediction mode of left side neighboring block, (2+(intra prediction mode value of left side neighboring block+61) % 64), (2+(intra prediction mode value of left side neighboring block−1)%64)}.

As another example, 2) in a case where the intra prediction mode of the left side neighboring block and the intra prediction mode of the upper side neighboring block are not the same, the MPM list may be constructed as follows.

2-1) Under the condition in 2), in a case where neither the intra prediction mode of the left side neighboring block nor the intra prediction mode of the upper side neighboring block are the planar mode, the MPM list may be constructed with {intra prediction mode of left side neighboring block, intra prediction mode of upper side neighboring block, and planar mode}.

2-2) Under the condition in 2), in a case where neither the intra prediction mode of the left side neighboring block nor the intra prediction mode of the upper side neighboring block are the DC mode, the MPM list may be constructed with {intra prediction mode of left side neighboring block, intra prediction mode of upper side neighboring block, and DC mode}.

2-3) Under the condition in 2), in a case where the conditions in 2-1) and 2-2) are not satisfied, 2-3-1) if the horizontal size of the current block is larger than the vertical size thereof, the MPM list may be constructed with {intra prediction mode of left side neighboring block, intra prediction mode of the upper side neighboring block, horizontal mode).

2-3-2) Furthermore, if the condition in 2-3-1) is not satisfied, the MPM list may be constructed with (intra prediction mode of left side neighboring block, intra prediction mode of upper side neighboring block, and vertical mode}.

In the embodiment described above, when the basic intra prediction mode is added to the MPM list, the basic intra prediction mode that is fixed according to the block form of the current block may be added. The block form of the current block is at least one of a square and a rectangle. In addition, the horizontal size and the vertical size of the current block may be compared and thus it may be determined whether the block form of the current block is a rectangle in which the horizontal size is larger than the vertical size, or a rectangle in which the vertical size is larger than the horizontal size.

In the embodiment described above, "in a case where a horizontal size of the current block is larger than a vertical size thereof" may mean "in a case where a horizontal size of the current block is equal to or larger than a vertical size thereof".

In the MPM list, the intra prediction mode value of the left side neighboring block may serve as a reference. n may be subtracted from a value that is smaller than the intra prediction mode value of the left side neighboring block. In addition, n may be added to a value that is greater than the intra prediction mode value of the left side neighboring block n is not 0 and may be a positive integer.

According to still another embodiment in which three MPM candidate modes are used, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in the case where the intra prediction mode of the left side neighboring block is smaller than 2 (that is, the intra prediction mode of the left side neighboring block is the DC mode or the planar mode), 1-1-1) if the horizontal size of the current block is larger than the vertical size thereof, the MPM list may be constructed with {planar mode, DC mode, horizontal mode}.

1-1-2) Furthermore, if the condition in 1-1-1) is not satisfied, the MPM list may be constructed with {planar mode, DC mode, horizontal mode}.

1-2) Under the condition in 1), in a case where the condition in 1-1) is not satisfied, the MPM list may be constructed with {intra prediction mode of left side neighboring block, (2+(intra prediction mode value of left side neighboring block+61) % 64), (2+(intra prediction mode value of left side neighboring block−1)%64)}.

As another example, 2) in a case where the intra prediction mode of the left side neighboring block and the intra prediction mode of the upper side neighboring block are not the same, the MPM list may be constructed as follows.

2-1) Under the condition in 2), in a case where neither the intra prediction mode of the left side neighboring block nor the intra prediction mode of the upper side neighboring block are the planar mode, the MPM list may be constructed with {intra prediction mode of left side neighboring block, intra prediction mode of upper side neighboring block, and planar mode}.

2-2) Under the condition in 2), in a case where neither the intra prediction mode of the left side neighboring block nor the intra prediction mode of the upper side neighboring block are the DC mode, the MPM list may be constructed with {intra prediction mode of left side neighboring block, intra prediction mode of upper side neighboring block, and DC mode}.

2-3) Under the condition in 2), in a case where the conditions in 2-1) and 2-2) are not satisfied, 2-3-1) if the horizontal size of the current block is larger than the vertical size thereof, the MPM list may be constructed with {intra prediction mode of left side neighboring block, intra prediction mode of upper side neighboring block, and vertical mode}.

2-3-2) Furthermore, if the condition in 2-3-1) is not satisfied, the MPM list may be constructed with (intra prediction mode of left side neighboring block, intra prediction mode of the upper side neighboring block, horizontal mode).

According to the embodiment described above, an example where, when the basic intra prediction mode is added to the MPM list, the basic intra prediction mode that is fixed according to the block form of the current block is added may be provided.

In the embodiment described above, "in a case where a horizontal size of the current block is larger than a vertical size thereof" may mean "in a case where a horizontal size of the current block is equal to or larger than a vertical size thereof".

In the MPM list, the intra prediction mode value of the left side neighboring block may serve as a reference. n may be subtracted from a value that is smaller than the intra prediction mode value of the left side neighboring block. In addition, n may be added to a value that is greater than the intra prediction mode value of the left side neighboring block. n is not 0 and may be a positive integer.

According to still another embodiment in which three MPM candidate modes are used, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in a case where the intra prediction mode of the left side neighboring block is smaller than 2 (the intra prediction mode of left side neighboring block is the DC mode or the planar mode), the MPM list may be constructed with {planar mode, DC mode, vertical mode}.

1-2) Under the condition in 1), in a case where the condition in 1-1) is not satisfied, the MPM list may be constructed with {intra prediction mode of left side neighboring block, (2+(intra prediction mode value of left side neighboring block+OFFSET1) % MOD). (2+(intra prediction mode value of left side neighboring block−OFFSET2)% MOD)}.

As another example, 2) in a case where the intra prediction mode of the left side neighboring block and the intra prediction mode of the upper side neighboring block are not the same, the MPM list may be constructed as follows.

2-1) Under the condition in 2), in a case where neither the intra prediction mode of the left side neighboring block nor the intra prediction mode of the upper side neighboring block are the planar mode, the MPM list may be constructed with {intra prediction mode of left side neighboring block, intra prediction mode of upper side neighboring block, and planar mode}.

2-2) Under the condition in 2), in a case where neither the intra prediction mode of the left side neighboring block nor the intra prediction mode of the upper side neighboring block are the DC mode, the MPM list may, be constructed with {intra prediction mode of left side neighboring block, intra prediction mode of upper side neighboring block, and DC mode).

2-3) Under the condition in 2), in a case were the conditions in 2-1) and 2-2) are not satisfied, the MPM list may be constructed with (intra prediction mode of left side neighboring block intra prediction mode of upper side neighboring block, and vertical mode}.

OFFSET1 here may be a value that results from subtracting K from the total number of intra prediction modes for a luma component other than the LM mode and may be a positive integer.

As an example, the total number of intra prediction modes for the luma component other than LM mode may be 67 and may be a positive integer.

As another example, K may be 5 and may be a positive integer.

As still another example, OFFSET1 may be 62 and may be a positive integer.

MOD here may be a value that results from adding J to OFFSET1 and nay be a positive integer.

As an example, J may be 3 and may be a positive integer.

As another example, MOD may be 65 and may be a positive integer.

OFFSET2 here may be 1 and may be at least one of 0 and a positive integer.

As a result of the embodiment in which the three MPM candidate modes are used, the intra prediction mode that results from adding or subtracting a specific value to and from the intra prediction mode of the neighboring mode may be added to the MPM list, and the specific value may be at least one of −1 and +1, regarding the statement "1-2) under the condition in 1), in a case where the condition in 1-1) is not satisfied, the MPM list may be constructed with {intra prediction mode of left side neighboring block, (2+(intra prediction mode value of left side neighboring block+ OFFSET1) % MOD), (2+(intra prediction mode value of left side neighboring block−OFFSET2)% MOD)}".

That is, at least one of the values, that is, OFFSET1, OFFSET2, and MOD, may be changed, and thus the specific value may be replaced with a given value, regarding the statement "the intra prediction mode that results from adding or subtracting the specific value to and from the intra prediction mode of the neighboring block".

The given value may be 0 and may be at least one of a positive integer and a negative integer.

In the MPM list, the intra prediction mode value of the left side neighboring block may serve as a reference. n may be subtracted from a value that is smaller than the intra prediction mode value of the left side neighboring block. In addition, n may be added to a value that is greater than the intra prediction mode value of the left side neighboring block. n is not 0 and may be a positive integer.

According to still another embodiment in which three MPM candidate modes are used, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in a case where the intra prediction mode of the left side neighboring block is smaller than 2 (the intra prediction mode of left side neighboring block is the DC mode or the planar mode), the MPM list may be constructed with {planar mode, DC mode, vertical mode}.

1-2) Under the condition in 1), in a case where the condition in 1-1) is not satisfied, the MPM list may be constructed with {intra prediction mode of left side neighboring block, (2+(intra prediction mode value of left side neighboring block+OFFSET1) % MOD), (2+(intra prediction mode value of left side neighboring block−OFFSET2)% MOD)).

As another example, 2) in case where the condition in 1) is not satisfied, the MPM list may be constructed as follows.

2-1) Under the condition in 2), in a case where neither the intra prediction mode of the left side neighboring block nor the intra prediction mode of the upper side neighboring block are the planar mode, the MPM list may be constructed with (intra prediction mode of left side neighboring block, intra prediction mode of upper side neighboring block, and planar mode}.

2-2) Under the condition in 2), in a case where neither the intra prediction mode of the left side neighboring block nor the intra prediction mode of the upper side neighboring block are the DC mode, the MPM list may be constructed with {intra prediction mode of left side neighboring block intra prediction mode of upper side neighboring block, and DC mode}.

2-3) Under the condition in 2), in a case where the conditions in 2-1) and 2-2) are not satisfied, the MPM list may be constructed with {intra prediction mode of left side neighboring block, intra prediction mode of upper side neighboring block, and vertical mode}.

OFFSET1 here may be a value that results from subtracting K from the total number of intra prediction modes for the luma component other than the LM mode and may be a positive integer.

As an example, the total number of intra prediction modes for the luma component other than the LM mode may be 67 and may be a positive integer.

As another example, K may be 6 and may be a positive integer.

As still another example, OFFSET1 may be 61 and may be a positive integer.

MOD here may be a value that results from adding J to OFFSET1 and may be a positive integer.

As an example, J may be 4 and may be a positive integer.

As another example, MOD may be 65 and may be a positive integer.

OFFSET2 here may be 0 and may be at least one of 0 and a positive integer.

As a result of the embodiment in which the three MPM candidate modes are used, the intra prediction mode that results from adding or subtracting a specific value to and from the intra prediction mode of the neighboring mode may be added to the MPM list, and the specific value may beat least one of −2 and +2, regarding the statement "1-2) under the condition in 1), in a case where the condition in 1-1) is not satisfied, the MPM list may be constructed with {intra prediction mode of left side neighboring block, (2+(intra prediction mode value of left side neighboring block+ OFFSET1) % MOD), (2+(intra prediction mode value of left side neighboring block−OFFSET2)% MOD)}.

In the MPM list, the intra prediction mode value of the left side neighboring block may serve as a reference. n may be subtracted from a value that is smaller than the intra prediction mode value of the left side neighboring block. In addition. n may be added to a value that is greater than the intra prediction mode value of the left side neighboring block. n is not 0 and may be a positive integer.

According to still another embodiment in which three MPM candidate modes are used, the MPM list may be constructed using the following process.

As an example, 1) in a case where the intra prediction mode of the left side neighboring block and the intra prediction mode of the upper side neighboring block are the same, the MPM list may be constructed as follows.

1-1) Under the condition in 1), in a case where the intra prediction mode of the left side neighboring block is smaller than 2 (the intra prediction mode of left side neighboring block is the DC mode or the planar mode), the MPM list may be constructed with {planar mode, DC mode, vertical mode}.

1-2) Under the condition in 2), in a case where the condition 1-1) is not satisfied, 1-2-1) if the intra prediction mode of the left side neighboring block is the same as a maximum value that the directional mode can take, the MPM list may be constructed with {intra prediction mode of left side neighboring block, intra prediction mode value of left side neighboring block−2, intra prediction mode value of left side neighboring block−1}.

1-2-2) Furthermore, if the intra prediction mode of the left side neighboring block is the same as a minimum value that the directional mode can take, the MPM list may be constructed with {intra prediction mode of left side neighboring block, intra prediction mode value of left side neighboring block+1, intra prediction mode value of left side neighboring block+2}.

1-2-3) Furthermore, if the conditions in 1-2-1) and 1-2-2) are not satisfied, the MPM list may be constructed with {intra prediction mode of left side neighboring block, intra prediction mode value of left side neighboring block+OFFSET2, intra prediction mode value of left side neighboring block−OFFSET2}.

As another example, 2) in case where the condition in 1) is not satisfied, the MPM list may be constructed as follows.

2-1) Under the condition in 2) in a case where neither the intra prediction mode of the left side neighboring block nor the intra prediction mode of the upper side neighboring block are the planar mode, the MPM list may be constructed with {intra prediction mode of left side neighboring block, intra prediction mode of upper side neighboring block, and planar mode}.

2-2) Under the condition in 2), in a case where neither the intra prediction mode of the left side neighboring block nor the intra prediction mode of the upper side neighboring block are the DC mode, the MPM list may be constructed with {intra prediction mode of left side neighboring block, intra prediction mode of upper side neighboring block, and DC mode}.

2-3) Under the condition in 2), in a case where the conditions in 2-1) and 2-2) are not satisfied, the MPM list may be constructed with {intra prediction mode of left side neighboring block, intra prediction mode of upper side neighboring block, and vertical mode}.

OFFSET2 here may be 1 and may be at least one of 0 and a positive integer.

In the embodiment described above, when the intra prediction mode that results from adding or subtracting the specific value to and from the intra prediction mode of the neighboring block is added up the MPM list, the intra prediction mode to which the specific value is added may be set not to exceed the maximum value that the directional mode can take, and the intra prediction mode from which the specific value is subtracted may be set not to fall below the minimum value that the directional mode can take.

In the embodiment described above, the maximum value that the directional mode can take is 66 that is the intra prediction mode value of the second diagonal mode. In addition, in the embodiment described above, the minimum value that the directional mode can take is 2.

In a case where, the candidate modes in the MPM list are constructed with {IPM1, IPM2, IPM3}, it may be meant that an IPM1 candidate mode, an IPM2 candidate mode, and an IPM3 candidate mode are added to the MPM list in such a manner that they are placed in the highest position, the second highest position, and the third highest position, respectively. At this time, IPM1 may be allocated index information (mpm_idx) indicating an MPM index, which is 0, IPM2 may be allocated index information that is 1, and IPM3 may be allocated index information that is 2. That is, the candidate mode that is added earliest to the MPM list may have the smallest MPM index.

In addition, in a case where the candidate modes in the MPM list are {IPM1, IPM2, IPM3}, MPM[0] may mean IPM1, MPM[1] may mean IPM2, and MPM[2] may mean IPM3.

In addition, the order of the candidate modes in the MPM list may not be fixed. The order of the candidate modes in the MPM list may be changed, and the changed order may be used.

The embodiments are described above on the assumption that three candidates are in the MPM list. However, the present invention is not limited to this and may also find application in a case were the number of candidates in the MPM list is N. At this point. N is a positive integer and may be 5 or 6.

In the embodiment described above, the block form of the current block may be used in at least one of a case where the intra prediction mode of the neighboring block is added to the MPM list, a case where the intra prediction mode that results from adding or subtracting the specific value to and from the intra prediction mode of the neighboring block is added to the MPM list, and a case where the basic intra prediction mode is added to the MPM list.

In addition, the number of prediction modes that are included in the MPM list may differ on the basis of a form of the current block.

In the embodiment described above, the number of the intra prediction modes that include the DC mode, the planar mode, the LM mode, and 65 directional modes is 68. In addition, the maximum number of the intra prediction modes that are included in the MPM list may be one of integers that include 2, 3, 4, 5, 6, 7, 8, 9, and so on.

In the embodiment described above, in a case where the number of remaining intra prediction modes is K, the remaining intra prediction mode index (rem_intra_luma_pred_mode) may be entropy-encoded/decoded as an N-bit fixed length code that is N bits in length. At this point, K and N may have their relationship of $2^N=K$ with each other.

As an example, in a case where the total number of intra prediction modes for the luma component is 67 and where a total of three candidate modes are added to the MPM list, the total number of remaining intra prediction modes for the luma component, which remain after the MPM list is constructed, may be 64, and the fixed length code that is a total of 6 bits in length may be used in order to entropy-encoding/decode the remaining intra prediction mode for the luma component.

In addition, the remaining intra prediction mode index may be entropy-encoded/decoded as a truncated binarization.

A given candidate mode in the derived MPM list may be derived as the intra prediction mode of the current block. As an example, the intra prediction mode of the current block may be derived as a candidate mode that corresponds to the first position in the MPM list. As another example, an index that corresponds to a given mode within the list may be encoded/decoded, and the given mode may be derived as the intra prediction mode of the current block.

In a case where the MPM list is constructed, one MPM list may be constructed in a manner that is suitable for a given block size. In a case where a block with the given block size is partitioned, the constructed MPM list may be used for subblocks that result from the partitioning. Alternatively, in a case where the MPM list is constructed, each of the MPM lists for the subblocks that result from the partitioning to a given block size or smaller may be constructed on the basis of the given block size. Alternatively, an MPM list for some other subblocks may be constructed using an MPM list for some subblocks of the subblocks that result from the partitioning to the given size or smaller.

The intra prediction mode of the current block may be derived using at least one or both of the intra prediction mode of the current block (intra_pred_mode) that is derived using the MPM list, and the intra prediction mode of the neighboring block.

As an example, in a case where the intra prediction mode of the current block that is derived using the MPM list is intra_pred_mode, a change from intra_pred_mode to a given mode may be performed using one or more intra prediction modes of the neighboring block, and thus the intra prediction mode of the current block may be derived.

As another example, intra_pred_mode and the intra prediction mode of the neighboring block may be compared, and thus intra_pred_mode may be increased or decreased by N. At this time, N may be one of given integers that include +1, +2, +3, 0, −1, −2, −3, and so on. For example, in a case where intra_pred_mode is smaller than the statistical value of the intra prediction modes of the neighboring block and/or of intra prediction modes of one or more neighboring block, intra_pred_mode may be increased. Alternatively, in a case where intra_pred_mode is greater than the intra prediction mode of the neighboring block, intra_pred_mode may be decreased. Alternatively, in a case where intra_pred_mode is greater than the statistical value of the intra prediction modes of the neighboring blocks, intra_pred_mode may be decreased.

In a case where multiple MPM lists are constructed, the intra prediction mode of the current block may be derived or the intra prediction mode of the current block may be entropy-encoded/decoded, using N MPM lists. At this time, N may be 0 or a positive integer. In addition, the N MPM lists may be generated using at least one or more of the coding parameters of the current block.

At this time, at least one or more of an MPM list for the current block, an MPM list for a higher block, and an MPM list for the neighboring block may be included in multiple MPM lists for the current block. At this point, at least one current block of subblocks within a specific block may be the current block, and in this case, a block higher than the subblock may be the specific block. At this point, a subblock may be included in the specific block. In addition, a subblock may be a subblock that results from partitioning the specific block. In addition, at least one or more of the subblocks that do not correspond to the current block, of the subblocks that result from partitioning the specific block, may be neighboring blocks.

When MPM lists for at least one or more of higher blocks and neighboring blocks are included in multiple MPM lists for the current block, multiple MPM lists may be constructed in such a manner that redundant intra prediction modes are not present among the MPM lists. Checking of redundancy among the MPM lists may be performed in a step of constructing multiple MPM lists. In addition, the checking of redundancy among the MPM lists may be performed after multiple MPM lists are all constructed. In addition, the checking of redundancy among the MPM lists may be performed each time the intra prediction mode is added to the MPM list.

In a case where multiple MPM lists are constructed, at least one of information for specifying the MPM list in which the intra prediction mode of the current block is included, and index information for the candidate mode in the MPM list may be signaled.

When, using multiple MPM lists, the intra prediction mode of the current block is derived or the intra prediction mode of the current block is entropy-encoded/decoded, an indicator (MPM flag) indicating whether or not the intra prediction mode that is the same as the intra prediction mode of the current block is present among the intra prediction modes included in each of the multiple MPM lists may be entropy-encoded/decoded.

In a case where the intra prediction mode that is the same as the intra prediction mode of the current block is present among the intra prediction modes included in a specific MPM list of the multiple MPM lists, index information (MPM index) for a position on the specific MPM list, at which the intra prediction mode is present, or for the order of inclusion in the specific MPM list, may be entropy-encoded.

In a case where the intra prediction mode that is the same as the intra prediction mode of the current block is not present among the intra prediction modes included in the multiple MPM lists, a remaining intra prediction mode of the current block may be entropy-encoded in the encoder. In addition, the remaining intra prediction mode of the current block may be entropy-decoded, and the intra prediction mode that is the same as the intra prediction mode of the current block, of the intra prediction modes that are not included in the multiple MPM lists, may be identified.

In a case where the MPM list is constructed, the number of the candidate modes included in the MPM list may be N that is a given positive integer, and the candidate modes may be expressed MPM_mode_idx1, MPM_mode_idx2 . . . , MPM_mode_idxN. At this time, the order in which candidate modes, which correspond to idx1 to idxN, respectively, fill up the MPM list, may be decided adaptively on the basis of the frequency of the intra prediction modes of the neighboring blocks.

The MPM list may be initialized and then the frequency with which each of the intra prediction modes of the neighboring blocks occurs may be identified. As an example, the candidate modes, lists idx1 to idxN, that are stored, in this order, in the MPM list may be identified, and, when redundant intra prediction modes occur, the frequency of the intra prediction mode may be increased in increments of K. At this point, K may be a given positive integer. Update and reinitialization of the frequency with which each intra prediction mode of the neighboring block occurs may be performed using one of a per-block basis, a per-CU basis, a per-PU basis, a per-TU basis, a per-CTU basis, a per-slice basis, a per-tile basis, and a per-picture basis.

The frequency with which each of the candidate modes stored in the MPM list for the current block occurs may be identified, and the candidate modes that are stored, in sequential order, in the MPM list according to the frequency of occurrence may be rearranged in descending order or in ascending order. At this time, in a case where multiple intra prediction modes, each of which occurs with the same frequency, are present, an existing order may be maintained, or the exiting order may be changed.

A method of entropy-encoding/decoding the intra prediction mode of the current block will be described below.

The intra prediction mode of the current block may be encoded/decoded for derivation. At this time, the intra prediction mode of the current block may be entropy-encoded/decoded without using the intra prediction mode of the neighboring block.

The method of using an inter-color-component intra prediction mode will be described below.

The intra prediction mode of the current block may be derived using an intra prediction mode for a different color component (luma, chroma, or the like).

As an example, in a case where the current block is a chroma block, an intra prediction mode with respect to the chroma block may be derived using an intra prediction mode of a luma correspondence block that corresponds to the chroma target block.

At this time, one or more luma correspondence blocks may be present and may be decided on the basis of at least one of a size/form of the chroma block and a coding parameter. Alternatively, the decision may be made on the basis of at least one of a size/form of the luma block and a coding parameter. The luma block that corresponds to the chroma block may be constructed with multiple portions that result from partitioning.

One or several of, or all of the multiple partitioning-resulting portions may have different intra prediction modes. An intra prediction mode of the chroma block may be derived on the basis of one or several of, or all of the multiple partitioning-resulting portions of the luma block corresponding to the intra prediction mode of the chroma block. One or several of the partitioning portions may be selectively used on the basis of comparison in block size/form, depth information, or the like between the chroma block and the luma block (one or several of, or all of the multiple partitioning-resulting portions).

The partitioning-resulting portion in a position within the luma block, which corresponds to a given position of the chroma block, may be selectively used. The given position here may mean a corner sample position (for example, an left upper side sample) or a center sample position of the chroma block. The method described above is not limited to the use by the chroma block of the intra prediction mode of the luma block. At least one of mpm_idx of the chroma block and the MPM list may be shared.

In addition, in a case where a prediction mode of the luma correspondence block is an intra block copy mode (an IBC mode), a corresponding intra prediction mode is not present and thus, and therefore, the intra prediction mode with respect to the chroma block may be decided as the DC mode or the planar mode that is anon-directional mode.

Figure 9:
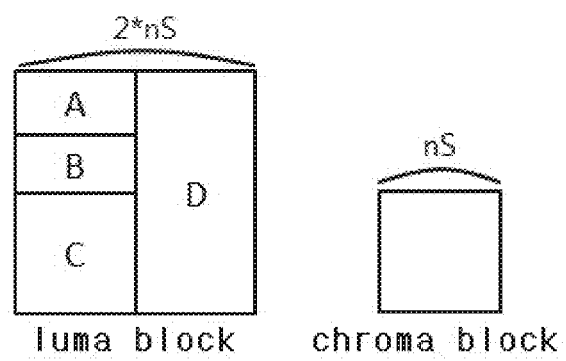
FIG. 9 is a diagram illustrating a relationship between a luma block and a chroma block in a case where a ratio among color components according to an embodiment of the present invention is 4:2:0.

FIG. 9 is a diagram illustrating a relationship between the luma block and the chroma block in a case where a ratio among color components according to an embodiment of the present invention is 4:2:0.

With reference to FIG. 9, the luma correspondence block corresponding to the chroma block may be at least one of A, B, C, and D. In a case where multiple luma correspondence blocks are present, the luma correspondence block that corresponds to a given position of the chroma block may be selected. The given position may be decided on the basis of at least one of the size, the form, and the depth of the chroma block. Alternatively, the statistical value of the intra prediction modes of multiple luma correspondence blocks may be used.

One intra prediction mode that corresponds to at least one of the luma blocks A, B, C, and D may be derived as the intra prediction mode of the chroma block.

As an example, the intra prediction mode of the chroma block may be derived through combination of two or more intra prediction modes within the luma block corresponding to the size of the chroma block.

As an example, a prediction mode of the chroma block may be derived on the basis of at least one of size/form information and depth information on the luma block.

As still another example, the prediction mode of the chroma block may be derived on the basis of at least one of the size/form information and the depth information on the luma block.

The method of performing derivation on a per-subblock basis will be described below.

In a case where the current block is partitioned into lower blocks or subblocks, an intra prediction mode with respect to each of the subblocks resulting from the partitioning may be derived using at least one or more of methods of deriving the intra prediction mode with respect to the current block.

An indicator (flag) indicating that the current block is derived using the intra prediction mode of the neighboring block may be encoded/decoded. The indicator may be encoded/decoded on the basis of at least one of the current block and the subblock. At this time, only in a case where the size of the current block or a size of the subblock corresponds to a given size or falls within a given size range, the indicator may be encoded/decoded.

As an example, in a case where the indicator takes on a first value, as described above, at least one more of partition information on the current block, the intra prediction mode of the current block, and an intra prediction mode of the subblock may be decoded.

As another example, in a case where the indicator takes on a second value, the current block may be partitioned into subblocks. At this time, the subblock may be partitioned to a given or pre-defined size/form. In addition, the partition information may be encoded and be partitioned.

As still another example, the intra prediction mode of the subblock resulting from the partitioning may be derived using the intra prediction mode of the neighboring block. At this time, the intra prediction mode of the current block may be decoded for use.

As still another example, the intra prediction may be performed on the current block or the subblock using each derived intra prediction mode.

In a case where the current block is partitioned into subblocks and where the intra prediction mode with respect to each of the subblocks resulting from the partitioning is derived, each intra prediction mode may be derived using the intra prediction mode of the neighboring block.

As an example, a statistical value (for example, an average value) of the intra prediction modes of blocks that are present at the left and top sides of a sample positioned at [0, 0], of each subblock, may be derived as the intra prediction mode of the subblock.

As another example, the intra prediction mode of each subblock may be derived using the intra prediction mode present in the neighborhood of the current block. At this time, one or more intra prediction modes in the neighborhood of the current blocks that are present on the left and top sides of the sample positioned at [0, 0], of each subblock may be used.

In a case where the current block is partitioned and where the intra prediction mode with respect to each subblock is derived, the intra prediction mode with respect to the current block may be derived using the MPM list, and then may be derived for each subblock using the derived mode and/or the intra prediction mode of the neighboring block.

The current block may be derived into multiple subblocks that are smaller in size than the current block, and then the intra prediction mode of each subblock may be derived. At this time, the intra prediction mode may mean an intra prediction direction. At this time, the intra prediction mode may be included in an intra prediction mode set that is pre-defined in the encoder and the decoder.

As an example, an intra prediction direction field (hereinafter referred to as an IPDF) with respect to the current block may be generated using the intra prediction mode of the current block and at least one or more of the intra prediction modes of the blocks that are encoded/decoded with the intra prediction, of the restored blocks adjacent to the current block. At this time, when generating the intra prediction direction field, a specific transform model may be used. The IPDF may be generated, and then the intra prediction mode of each subblock within the current block may be decided using the generated IPDF.

The specific transform model may use at least one or more of a rigid transform, a similarity transform, an affine transform, a homography transform, a 3D transform), and other transforms. At this time, the homography transform may be a transparent transform.

The size (granularity) of the subblock may be smaller or larger than the size of the current block. For example, when the size of the current block is M×N (M and N are positive integers), the size of the subblock may be M/K×N/L where K is a positive submultiple of M and L is a positive submultiple of N. In addition, MK or N/L may be a positive integer. The size (granularity) of the subblock may be entropy-encoded/decoded into a bitstream. In addition, the size (granularity) of the subblock may not be transferred and may be derived adaptively in the encoder/decoder according to the size of the current block and the IPDF. In addition, the size of the subblock may be decided on the basis of at least one or both of the coding parameter of the current block and the coding parameter of each of the neighboring blocks of the current block.

In addition, as many as P subblocks may be present within the current block when the current block serves as a reference. At this point, P may be 0 or a positive integer. For example, one subblock, two subblocks, four subblocks, 16 subblocks and so on may be present within the current block.

In addition, information on whether or not the current block is partitioned into the subblocks may or may not be entropy-encoded/decoded. In a case where the information described above is not separately entropy-encoded/decoded, whether or not the current block is partitioned into subblocks may be determined on the basis of information indicating whether or not the intra prediction mode of the current block is derived on a per-subblock basis.

In addition, the intra prediction mode of the subblock may be derived using the intra prediction mode of the current block and at least one or more of the intra prediction modes of the blocks that are encoded/decoded with the intra prediction, of the restored blocks adjacent to the current block, and therefore, the intra prediction mode of the subblock may not be entropy-encoded/decoded. On the other hand, the intra prediction mode of the current block may be entropy-encoded/decoded. However, in a case where the current block is constructed with one subblock, the intra prediction mode may not be entropy-encoded/decoded and may be derived using at least one or more of the intra prediction modes of the blocks that are encoded/decoded with the intra prediction, of the restored blocks adjacent to the current block.

The blocks that are encoded/decoded with the intra prediction, of the restored blocks adjacent to the current block used for the IPDF generation may be referred to as a seed block, a position of such a block may be referred to as a seed point, and the intra prediction mode that is retained by the seed block including the seed point may be referred to as a seed point intra prediction mode (hereinafter referred to as an SPIPM).

At this time, the seed point may be at least one of multiple neighboring blocks that are encoded/decoded with the intra prediction mode. At this time, the seed block or the seed point may have a fixed value with respect to the current block and may have a value that varies adaptively according to the size or the form of the current block or the subblock. As an example, at least one or more of upper side, left side, left upper side, left lower side, and right upper side blocks or positions with respect to the current block may be decided as a seed block or a seed point. The IPDF may be generated using an SPIPM of the seed point.

The IPDF may be generated using a specific transform model, and then intra prediction modes of subblocks (K×L) within the current block (W×H) may be allocated using the IPDF. At this time, as the size (granularity) K×L (a positive integer that is such that K≤W) and a positive integer that is such that L≥H)) of the subblock, a fixed size that is larger or smaller than the size of the current block may be used.

The intra prediction modes of the subblocks may be allocated using the decided IPDF. At this time, coordinates at a specific position within each subblock may be substituted into a decided IPDF model, and an intra prediction mode at such a position may be acquired from a vector value. At this time, the specific position may be decided as a position of an arbitrary pixel within the subblock or a position in contact with a boundary of the subblock. As an example, at least one of left upper side, right upper side, left lower side, right lower side, and middle positions on the subblock may be decided as the specific position. In addition, in a case where allocation as the intra prediction modes of the subblocks is made using the IPDF, the IPDF may be allocated as the intra prediction modes of the subblocks on the basis of a nearest neighbor method. In addition, in the case where allocation as the intra prediction modes of the subblocks is made using the IPDF, the IPDF may be quantized as an integer type and may be allocated as the intra prediction modes of the subblocks. In addition, in the case where allocation as the intra prediction modes of the subblocks is made using the IPDF, the IPDF may rounded off to the nearest integer and may be as the intra prediction modes of the subblocks.

The intra prediction mode may be derived on a per-subblock basis using the intra prediction mode of the current block and at least one or more of the intra prediction modes of the blocks that are encoded/decoded with the intra prediction, of the restored blocks adjacent to the current block. The intra prediction may be performed on a per-subblock basis using the derived intra prediction mode. At this time, the subblock that is previously encoded/decoded on a per-subblock basis may be used subsequently as a reference sample of the intra prediction on a per-subblock basis.

In the encoder, at least one of a primary transform, a secondary transform, and quantization may be performed on a remaining block that is generated after performing the intra prediction on a per-subblock basis, and thus a transform coefficient may be generated. The generated transform coefficient may be entropy-encoded. The primary transform, the secondary transform, and the quantization may be performed on the current block and may be performed on a per-subblock basis. As an example, at least one of the primary transform, the secondary transform, and the quantization may be performed on the entire current block, and at least one of the primary transform, the secondary transform, and the quantization may be performed on a per-subblock basis. At this time, none of the primary transform, the secondary transform, and the quantization may be performed on the current block or the subblock. In addition, in the decoder, the transform coefficient may be entropy-decoded. At least one of inverse quantization, a primary inverse transform, and a secondary inverse transform may be performed on the entropy-decoded transform coefficient, and the restored remaining block may be generated. The primary inverse transform, the secondary inverse transform, and the inverse quantization ay be performed on the current block and may be performed on a per-subblock basis. As an example, at least one of the primary inverse transform, the secondary inverse transform, and the inverse quantization may be performed on the entire current block, and at least one of the primary inverse transform, the secondary inverse transform, and the inverse quantization may be performed on a per-subblock basis. At this time, none of the primary inverse transform, the secondary inverse transform, and the inverse quantization may be performed on the current block or the subblock.

In a case where the intra prediction mode is derived, the information on the intra prediction may be entropy-encoded/decoded from a bitstream. For example, the information on the intra prediction may include at least one or more of the following pieces of information.

Indicator indicating whether or not the same mode that is the same as the intra prediction mode of the current block is present in the MPM list: prev_intra_luma_pred_flag Index information indicating which mode of the modes included in the MPM list is the same as the intra prediction mode of the current block: mpm_idx Index information indicating which mode of the modes included in the secondary MPM list is the same as the intra prediction mode of the current block: 2nd_mpm_idx Remaining intra prediction mode index: rem_intra_luna_pred_mode Intra chroma-component prediction mode index: intra_chroma_pred_mode At least one or more of the pieces of information on the intra prediction may not be signaled on the basis of at least one or both of the size and the form of the block. The information that is not signaled may be derived as a given value or may be derived as information on a previous or higher block.

As an example, in a case where the size of the current block corresponds to a given size, at least one or more of pieces of information on intra prediction with respect to the current block may not be signaled, and information on the intra prediction with respect to the current block may be derived using at least one or more of pieces of information on the intra prediction corresponding to a size of a higher block that is previously encoded/decoded.

When entropy-encoding/decoding at least one or more of the pieces of information on the intra prediction, at least one or more of the following binarization methods may be used Truncated Rice Binarization Method K-th Order Exponential Golomb(K-th order Exp_Golomb) Binarization Method Constrained K-th Order Exponential Golomb (K-th order Exp_Golomb) Binarization Method Fixed-length Binarization Method Unary Binarization Method Truncated Unary Binarization Method The reference sample construction step will be described below.

In a case where the intra prediction with respect to the current block or the subblock that has a smaller size/form than the current block is performed on the basis of the derived intra prediction mode, a reference sample used for the intra prediction may be constructed.

A method of and an apparatus for encoding/decoding an intra prediction mode according to the present disclosure may construct a reference sample used for intra prediction of the current block using at least one or more of a method of selecting a reference sample, a method of determining availability of and padding a reference sample, and a method of filtering a reference sample.

Figure 10:
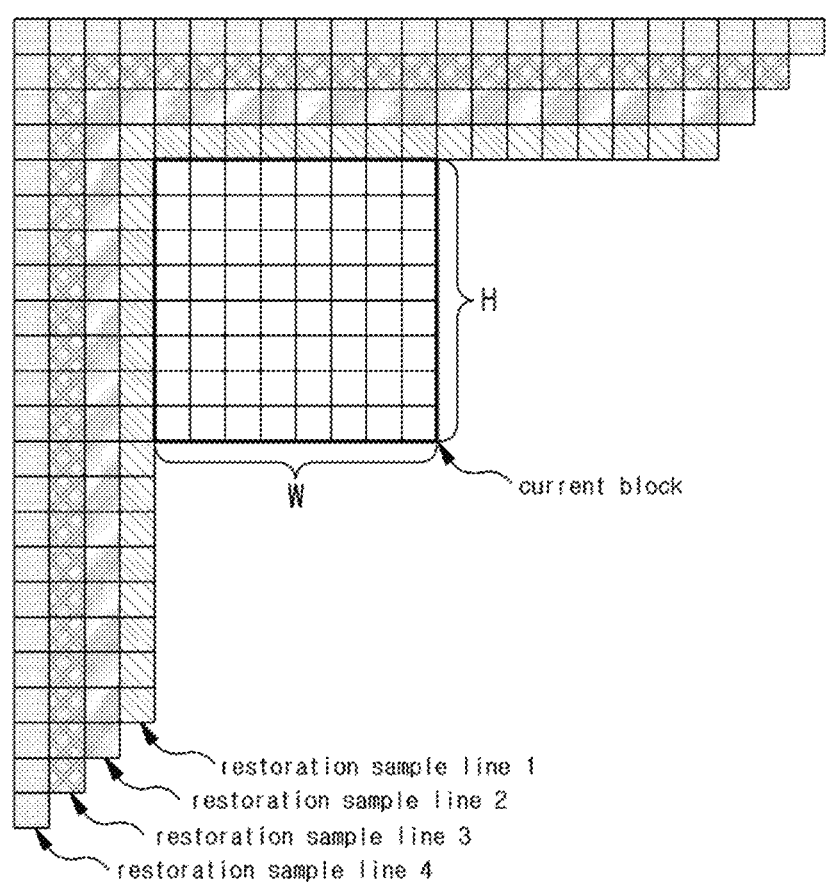
FIG. 10 is a diagram illustrating a restored sample line with respect to the current block according to the embodiment of the present invention.

At this point, the reference sample may be constructed using one or more restored samples or sample combinations in the neighborhood of the current block, which are included in one or more restoration sample lines that are illustrated in FIG. 10, and filtering may be applied to the constructed reference sample. At this time, each of the restoration samples on multiple restoration sample lines may be used as is, or the reference sample may be constructed after applying inter sample filtering on the same restoration sample line or inter sample filtering on different restoration sample lines.

The constructed reference sample may be expressed as ref[m, n], and the neighboring restored sample or a sample resulting from filtering the neighboring restored sample may be expressed as rec[m, n]. m or n may be a given integer value. In a case where the size of the current block is (W×H) where W is a horizontal length and H is a vertical length, when a position of a sample on the left upper side within the current block is (0, 0), a relative position of the closest reference sample on the left upper side with respect to the position of the sample may be set to (−1, −1).

The method of selecting a reference sample will be described below.

The reference sample may be constructed using one or more restoration sample lines adjacent to the current block. One or multiple lines of reference samples may be constructed.

As an example, as illustrated in an example in FIG. 10, at least one or more lines of multiple restoration sample lines may be selected, and thus the reference sample may be constructed.

As another example, as illustrated in the example in FIG. 10, restoration sample line 1 and restoration sample line 2 may be selected fixedly, and thus reference samples in multiple lines may be constructed.

As still another example, as illustrated in the example in FIG. 10, four lines that correspond to restoration sample line 1 to the restoration sample line 4, respectively, may be selected, and thus the reference samples may be constructed.

As still another example, as illustrated in the example in FIG. 10, two or more restoration sample lines may be selected adaptively, and thus the reference samples may be constructed.

As still another example, as illustrated in the example in FIG. 10, one line may be selected fixedly, and one other line or multiple other lines may be adaptively selected to construct the reference sample.

In a case where the adaptive selection is made, an indicator or an index that corresponds to information on the selected line may be signaled. Alternatively, without the signaling, the adaptive selection may be made using at least one of coding parameters of the size/form of the current block or the neighboring block, the intra prediction mode, and the like.

The reference sample may be constructed using a statistical value of multiple restoration samples selected from one or more lines in FIG. 10, on the basis of at least one of a distance from the current block and the intra prediction mode.

As an example, in a case where the statistical value is a weighted sum, a weighting factor may be decided adaptively according to a distance from the current block to a reference sample line.

As another example, the reference sample may be constructed by calculating at least one or more of an average value, a maximum value, a minimum value, a median value, and a mode of the multiple restoration samples, on the basis of at least one or both of the distance from the current block and the intra prediction mode.

A method of constructing the reference sample adjacent to the upper side of the current block and a method of constructing the reference sample adjacent to the left side thereof may be set to be different from each other.

As an example, the number of reference sample lines on the upper side and the number of reference sample lines on the left side may be set to be different from each other. For example, one reference sample line adjacent to the upper side and two reference sample lines adjacent to the left side may be constructed according to at least one of a magnitude of a horizontal or vertical length of the current block and the intra prediction mode.

As another example, a length of the reference sample line on the upper side and a length of the reference sample line on the left side may be set to be different from each other. For example, the length described above may be set to differ according to at least one of the magnitude of the horizontal or vertical length of the current block and the intra prediction mode.

As still another example, at least one of the number of the reference sample lines and the length of the reference sample line on the left side may be derived using at least one of the number of the reference sample lines and the length of the reference sample line on the upper side. In addition, at least one of the number of the reference sample lines and the length of the reference sample lines on the upper side may be derived using at least one of the number of the reference sample lines and the length of the reference sample line on the left side.

At least one of the number of the restoration sample lines used for the construction of the reference sample, a position of the restoration sample line, and a method of constructing the restoration sample line may be set to differ according to a case where a boundary of the upper side or the left side of the current block corresponds to a boundary of at least one of a picture, a slice, a tile, and a coding tree unit (CTB).

As an example, as illustrated in the example in FIG. 10, in a case where the reference sample is constructed using at least two or more of the restoration sample lines 1 to 4, if an upper side boundary of the current block corresponds to a CTB boundary, restoration sample line 1 may be used for the upper side, and at least two or more of restoration sample lines 1 to 4 may be used for the left side.

Information indicating that the reference sample is constructed with at least one or more of the methods described above may be encoded/decoded. For example, information indicating whether or not multiple restoration sample lines are used, information on the selected restoration sample line, and the like may be encoded/decoded. For example, at least one of the pieces of information described above may be encoded/decoded at least one of a sequence level, a picture level, a slice level, a tile level, a CTU level, a CU level, a PU level, and a TU level. In addition, information indicating whether or not multiple restoration sample lines are used may be signaled at a higher level (a sequence, a picture, a slice, a tile, or the like) than the information on the selected restoration sample line.

The method of determining availability of and padding a reference sample will be described below.

The determination of the availability of the block including the reference sample and/or the padding of the reference sample may be performed. For example, in a case where the block including the reference sample is available, the corresponding reference sample may be used. On the other hand, in a case where the block including the reference sample described above is unavailable, the unavailable reference sample may be padded using one or more available neighboring reference samples, and thus the unavailable reference sample may be replaced.

In a case where the reference sample is present outside at least one of given boundaries of a picture, a slice, a tile, and a coding tree unit (CTB), it may be determined that the reference sample is unavailable.

In a case where the current block is encoded with a constrained intra prediction (CIP), if the block including the reference sample is encoded/decoded with an inter prediction mode, it may be determined that the reference sample is unavailable.

In a case where it is determined that the neighboring restored sample is unavailable, the unavailable sample may be replaced using a neighboring available restored sample. For example, as illustrated in an example in FIG. 11, in a case where an available sample and an unavailable sample are present, the unavailable sample ma be replaced using one or more available samples.

Figure 11:
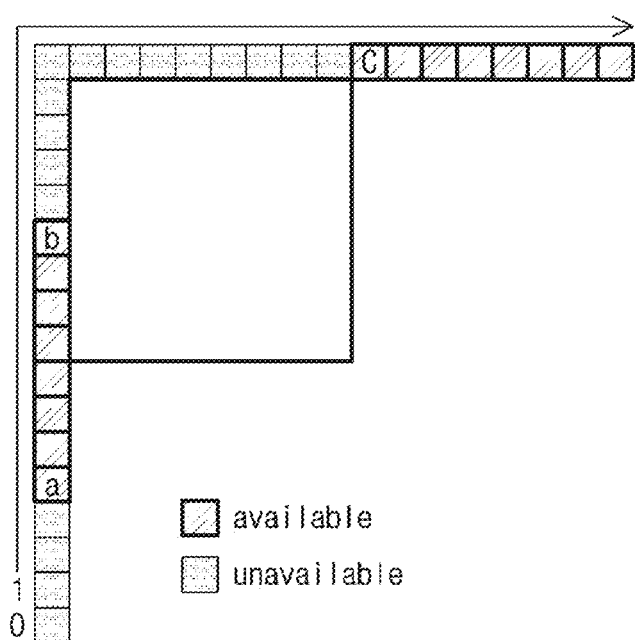
FIG. 11 is a diagram illustrating an available sample and an unavailable sample according to an embodiment of the present invention.

As an example, as illustrated in the example in FIG. 11, in a case where b and c are available, but samples between b and c is unavailable, unavailable samples between b and c may be replaced by performing a bi-linear interpolation method that uses b and c.

A sample value of an unavailable sample may be replaced, in a given order, with a sample value of an available sample. The available sample that is used for replacing the unavailable sample may be an available sample adjacent to the unavailable sample. In a case where an adjacent available sample is not present, an available sample that appears easiest or is present closest may be used. For example, unavailable samples may be replaced sequentially, starting from a left lower side sample to an right upper side sample. Alternatively, the unavailable samples may be replaced sequentially, starting from a left lower side sample to an right upper side sample. Alternatively, the unavailable samples may be replaced sequentially, starting from an right upper side sample to a left lower side sample. Alternatively, the unavailable samples may be replaced sequentially, starting from an right upper side sample and/or a left lower side sample to an left upper side corner sample.

The method of filtering a reference sample will be described below.

For one or more reference samples constructed as described above, at least one of a determination as to whether or not to perform filtering, a filter coefficient, a filter shape, and the number of filter taps may be decided in a manner that varies according to at least one or more of the intra prediction mode of the current block, the size of the block, and the form of the block.

As an example, at least one of the determination as to whether or not to perform filtering, the filter coefficient, the filter shape, and the number of filter taps may be decided in a manner that varies according to the intra prediction mode of the current block.

As another example, at least one of the determination as to whether or not to perform filtering, the filter coefficient, the filter shape, and the number of filter taps may be decided in a manner that varies according to the size of the current block. At this time, a size N (N is a positive integer) of the current block may be defined as at least one of a horizontal length (W) of a block, a vertical length (H) of the block, a sum (W+H) of the horizontal and vertical lengths of the block, and the number (W×H) of pixels within the block.

As still another example, at least one of the determination as to whether or not to perform filtering, the filter coefficient, the filter shape, and the number of filter taps may be decided in a manner that varies according to the form of the current block. For example, only in a case where the current block is a block in the form of a square, the filtering may be performed. Alternatively, for example, only in a case where the current block is a block in the form of a non-square, the filtering may be performed. Alternatively, for example, only in the case where the current block is a block in the form of a square, the filtering may not be performed. Alternatively, for example, only in the case where the current block is a block in the form of a non-square, the filtering may not be performed.

The determination as to whether or not to perform the filtering on the multiple reference sample lines may be set to differ. For example, the filtering may be performed on the first reference sample line adjacent to the current block, and the filtering may not be performed on the second reference sample line.

At least one of a value that results from performing the filtering on the same reference sample and a value that results from not performing the filtering on the same reference sample may be used for the intra prediction.

In a case where the intra prediction mode (intra_pred_mode) of the current block is a directional intra prediction mode, the lower of a value of a difference from the vertical mode and a value of a difference from the horizontal mode may be derived. In a case where the derived value is greater than a threshold allocated to the size of the block, the filtering may be performed. In a case where the derived value is equal to or smaller than the threshold, the filtering may not be performed.

Bi-linear interpolation filtering may be performed on the current block having a large block size. For example, 2-nd order differential values in the vertical direction and in the horizontal direction with respect to the current block may be obtained, and in a case where this value is smaller than a specific threshold, the bi-linear interpolation filtering may be performed on the reference sample.

The step of performing intra prediction will be described below.

The intra prediction with respect to the current block or the subblock may be performed on the basis of the derived intra prediction mode and the reference sample.

The method of and the apparatus for encoding/decoding an intra prediction mode according to the present disclosure may perform the intra prediction on the current block using at least one or more methods, such as a directional intra prediction method, a non-directional intra prediction method, and an inter-color-component intra prediction method, and thus may derive at least one of an intra prediction block and an intra prediction sample.

The intra prediction block may be derived and then, boundary filtering may be performed on a boundary region of the intra prediction block generated from a specific intra prediction mode. At this time, the specific intra prediction mode may include at least one or both of the non-directional intra prediction mode like the planar mode and the DC mode, and/or the directional intra prediction mode.

A non-directional intra prediction mode method will be described below.

When performing the intra prediction of the current block, the non-directional intra prediction mode may be performed and the non-directional intra prediction mode may be at least one of the DC mode and the planar mode.

In the DC mode, prediction may be performed using an average value (a DC value) of at least one or more of the constructed reference samples. At this time, the filtering may be performed on at least one or more prediction samples positioned on a boundary of the current block. The DC prediction method may be performed differently on the basis of at least one of the size and the form of the current block. A range of the reference samples that is used for the DC mode may be specified on the basis of at least one of the size and the form of the current block.

Figure 12:
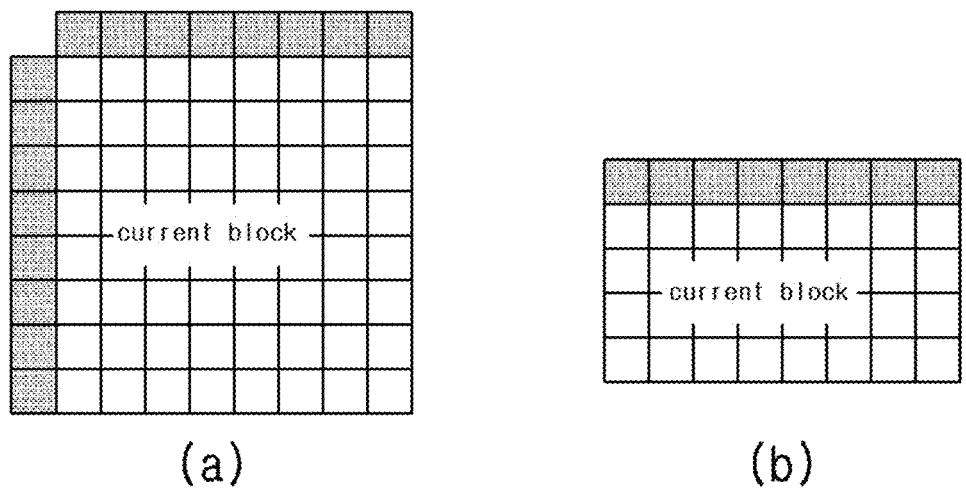
FIG. 12 is a diagram illustrating examples of the current blocks in the form of a square and a non-square according to the present invention.

As an example, in a case where the form of the current block, as illustrated in (a) of FIG. 12, is in the form of a square, the prediction may be performed using an average value of the reference samples on the upper side and the left side of the current block.

As another example, in a case where the current block is in the form of a non-square, a neighboring sample adjacent to the left side or the upper side of the current block may be used selectively. In a case where the current block, as illustrated in (b) of FIG. 12, is in the form of a rectangle, the prediction may be performed using an average value of the reference samples adjacent to the longer of the sides in the horizontal and vertical directions, of the current block.

As still another example, in a case where the size of the current block is a given size or falls within a given range, a given sample may be selected from among the reference samples on the upper side or the left side of the current block, and the prediction may be performed using an average of the selected samples. The given size may mean a fixed size N×M that is pre-defined in the encoder/decoder. N and M nay be integers that are greater than 0, and N and M may be the same or be different. The given range may mean a threshold for selecting a reference sample of the current block. The threshold may be at least one of a minimum value and a maximum value. The minimum value/the maximum value may be a fixed value that is pre-defined in the encoder/decoder and may be a variable value that is encoded and signaled in the encoder.

When the size of the current block is W×H, a range of given reference samples that are used in order to calculate the DC value may be set to differ according to the size and/or the form of the block. For example, in a case where W, H, W*H and/or W+H is equal to or smaller than a first size, a reference sample in a first group may be used. Alternatively, in a case where W, H, W*H and/or W+H is equal to or greater than a second size, a reference sample in a second group may be used. Reference samples in the first group and/or reference samples in the second group may include at least one or more reference samples selected from among left side, upper side, lower side, and right side reference samples. The calculated DC value may be allocated as a sample value of the intra prediction block of the current block.

In the planar mode, the prediction may be performed using a weighted sum that results from considering distances from one or more of the constructed reference samples, according to a position of intra prediction-target sample of the current block.

Figure 13:
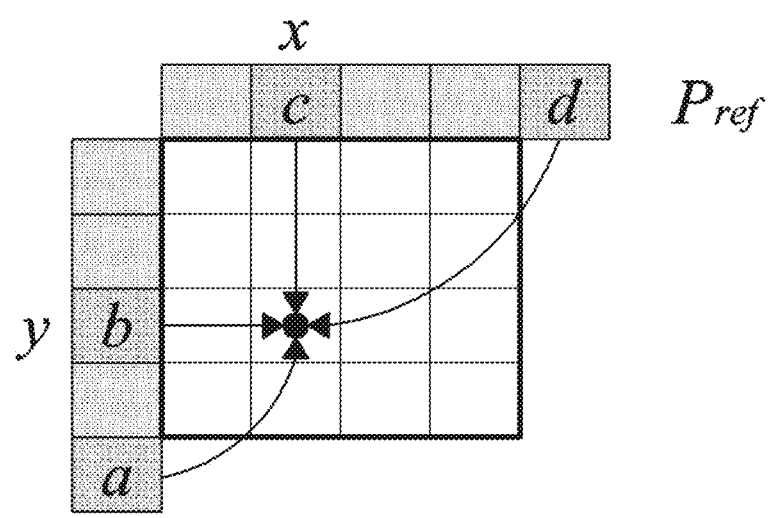
FIG. 13 is a diagram for describing a process of deriving a sample value in a planar mode according to an embodiment of the present invention.

In the planar mode, an intra prediction block sample value may be obtained with a weighted sum of N reference samples that depend on a pixel position (x, y). N may be a positive integer that is greater than 1. For example, as illustrated in an example in FIG. 13, in a case where N=4, a prediction value at each pixel position within a prediction block may be decided with a statistical value of an upper side reference pixel, a left side reference pixel, an upper right corner pixel of the current block, and a left lower side corner pixel of the current block. As an example, in a case where the statistical value is the weighted sum, the intra prediction block sample value may be calculated as in Equation 1 that is an example.

$$Pred(x, y) = \frac{y+1}{2 \cdot N_S} \cdot p_{ref}(-1, N_S) + \frac{N_S - 1 - x}{2 \cdot N_S} \cdot p_{ref}(-1, y) + \frac{N_S - 1 - y}{2 \cdot N_S} \cdot p_{ref}(x, -1) + \frac{x+1}{2 \cdot N_S} \cdot p_{ref}(N_S, -1)$$ [Equation 1]

The intra prediction block described above may be generated and, then the boundary filtering may be performed on a boundary region of the intra prediction block generated from a specific mode. At this time, the specific mode may include at least one or more of the non-directional mode like the planar mode and the DC mode, and/or the directional mode. At this time, one or multiple reference sample lines on the left side and/or on the upper side may be used for the boundary filtering.

As an example, the boundary filtering may be performed on N columns adjacent to a left side reference sample and M rows adjacent to an upper side reference sample within the intra prediction block in the DC mode. However, N ma be a positive integer that is equal to or smaller than a horizontal length W of the current block, and M may be a positive integer that is equal to or smaller than a vertical length H of the current block.

Figure 14:
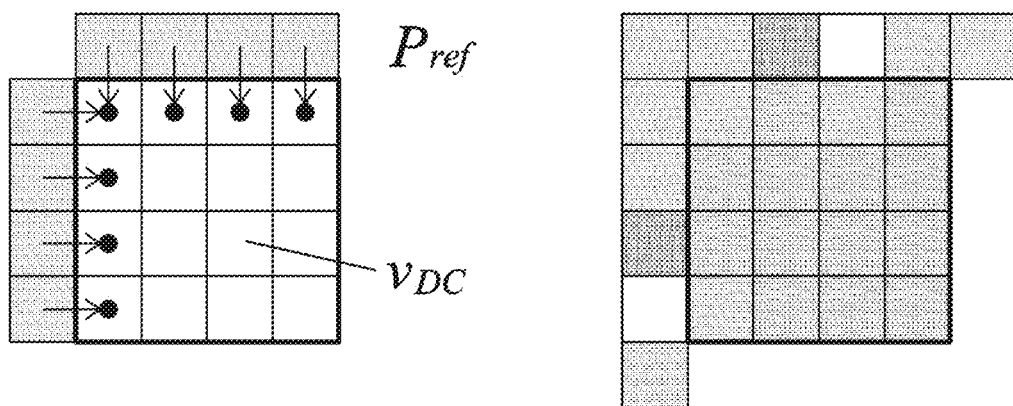
FIG. 14 is a diagram for describing a process of performing boundary filtering in a DC mode according to an embodiment of the present invention.

As another example, as illustrated in an example in FIG. 14 and in Equation 2 that is an example, when N=1 and M=1, the boundary filtering may be performed using one line of reference samples on the upper side and one line of reference samples adjacent to the upper side and the left side, respectively, of the current block. At this time, $B_C$ may be an intra prediction block in the DC mode, $p_{ref}$ may be a reference sample, and $v_{DC}$ may mean a DC value.

$$B_c(0, 0) = \frac{1}{4}(p_{ref}(-1, 0) + p_{ref}(0, -1) + 2v_{DC})$$ [Equation 2]

-continued $$B_c(x, 0) = \frac{1}{4}(p_{ref}(x, -1) + 3v_{DC})$$

$$B_c(0, y) = \frac{1}{4}(p_{ref}(-1, y) + 3v_{DC})$$

The directional intra prediction mode method will be described.

When performing the intra prediction of the current block, the directional intra prediction mode may be performed, and the directional intra prediction mode may be at least one of the horizontal mode, the vertical mode, and a mode having a given angle.

In the horizontal/vertical mode, the prediction may be performed using one or more reference samples that are present on a horizontal/vertical line at a position of the intra prediction-target sample.

In the mode having the given angle, the intra prediction may be performed using one or more reference samples that are present on, and in the neighborhood of, a line inclined by a given angle, at the position of the intra prediction-target sample. At this time, at least one of the N reference samples may be used, and at this time, N may be a positive integer. At this time, at least one of the reference samples may be positioned on an upper side of the current block, and the remaining reference samples may be positioned on the left side of the current block. Reference samples that are positioned on the upper side of the current block (or reference samples that are positioned on the left side) may be positioned on the same line and may be positioned on different lines.

In performing the directional intra prediction mode, a basis with which to apply the directional intra prediction mode may be set to differ. The basis may be one of a block, a subblock and a sample. That is, the intra prediction may be performed on at least one of a sample, a sample group, and a line within the current block, which serve as bases, using one or more directional intra prediction modes.

As an example, the prediction may be performed on a given sample group within the current block, which serves as a basis, using the directional intra prediction mode. That is, the prediction may be performed on groups, each including N samples within the current block, using different directional intra prediction modes, respectively. At this point, N may be a positive integer.

As another example, the prediction may be performed on a prediction-target sample within the current block, which serves as a basis, using the directional intra prediction mode. That is, the prediction may be performed on the prediction-target samples within the current block, using different directional intra prediction modes, respectively.

In a case where directional intra prediction mode is performed, the constructed reference sample may be reconstructed according to the directional intra prediction mode.

As an example, in a case where the directional intra prediction mode is a mode that uses all reference samples which are present on the left side and the upper side, the reference samples on the left side or the upper side may be constructed in a one-dimensional array.

Figure 15:
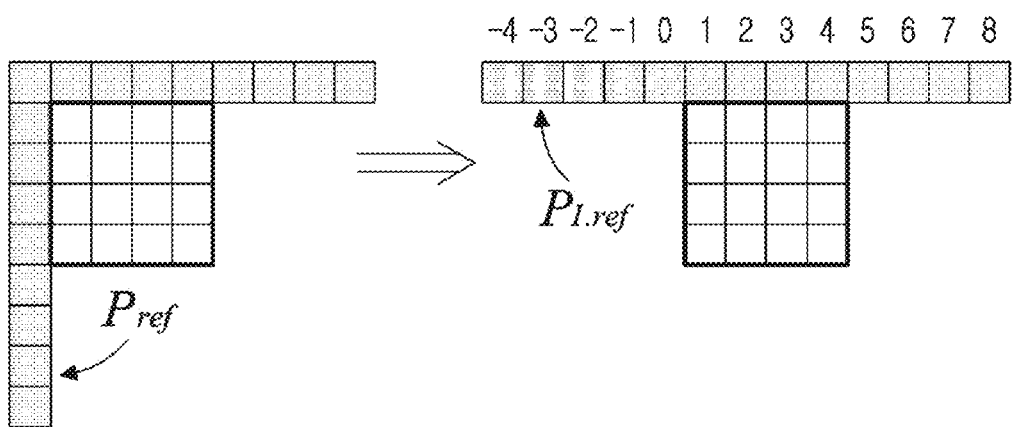
FIG. 15 is a diagram for describing a process of constructing reference samples according to an embodiment of the present invention, in a one-dimensional array.

As another example, with reference to FIG. 15, the reference samples on the left side may be constructed in a one-dimensional array, using one or more of the reference samples present on the left side. At this time, a sample of the left side samples, which is used in or order to construct the reference sample on the upper side, may differ according to the directional intra prediction mode. The reference sample on the upper side may be constructed by moving the left side reference sample, or the reference sample on the upper side may be constructed using a weighted sum of one or more left side reference samples.

In a case where the directional intra prediction mode is performed, interpolated prediction on a per-real-number basis may be performed. For example, on the basis of an angle parameter (intraPredAngle) that corresponds to the directional intra prediction mode, an offset (offset, iIdx) and/or a weighting factor (weight, iFact) for prediction sample interpolation may be decided as follows, according to a sample position within the current block.

For example, in a case where interpolation per 1/32 pixels is assumed, an offset and a weighting factor may each be decided for the directional intra prediction mode having the vertical direction, as in Equation 3 and Equation 4, respectively, which are examples.

$$iIdx=((y+1)intraPredAngle)>>5 \quad \text{[Equation 3]}$$

$$iFact=((y+1)*intraPredAngle)\&31 \quad \text{[Equation 4]}$$

A prediction sample value may be decided differently according to a value of iFact.

As an example, a case where iFact is not 0 may be a case where a prediction position in a reference sample $P_{1,ref}$ is on a per-real-number-pixel basis, not on a per-integer-pixel basis (full sample location), and a prediction sample value at a target sample position [x, y] may be generated as in Equation 5, which is an example, using two reference samples adjacent to the left and right sides, respectively, of a real-number pixel position. At this point, the per-real-number-pixel basis may mean a per-subpixel basis.

$$predSamples[x][y]=((32-iFact)*p_{1,ref}[x+iIdx+1]+iFact*p_{1,ref}[x+iIdx+2]+16)>>5 \quad \text{[Equation 5]}$$

As another example, in a case where iFact is 0, as in Equation 6, which is an example, the prediction sample value may be generated.

$$predSamples[x][y]=p_{1,ref}[x+iIdx+1] \quad \text{[Equation 6]}$$

In a case where the directional intra prediction mode is performed, the interpolated prediction may be performed using one or more reference samples. At least one of the number of reference sample lines, the number of interpolation filter taps, an interpolation filter coefficient value, the determination as to whether or not to perform filtering, and a weighted-average method may be used differently on the basis of at least one of the intra prediction mode of the current block, the size of the block, and the form of the block, and thus the prediction may be performed. At this time, at least one or multiple reference sample lines on the left side and/or the upper side may be used for intra prediction block interpolation.

As an example, the number of interpolation filter taps or the interpolation filter coefficient value may differ according to at least one of the size and the form of the current block.

As another example, in a case where multiple reference sample lines are used, the number of interpolation filter taps or the interpolation filter coefficient value may differ according to the reference sample line.

As still another example, in a case where the multiple reference sample lines are used, an interpolation filter may take a two-dimensional form.

In a case where the directional intra prediction mode is performed, the reference sample may be used by performing only reference sample filtering on the reference sample without applying the interpolation filter. For example, in a case where the prediction is performed on the sample of the current block, if the reference sample corresponding to the directional intra prediction mode is present at an integer position, the reference sample may be used without applying the interpolation filter. Reference sample filtering may be performed on the reference sample on which the interpolation filter is not applied.

As an example, the directional intra prediction mode may be at least one or more of {−14, −12, −10, −6, 72, 76, 78, 80}.

As another example, the directional intra prediction mode may include an angle that is a multiple of 45 degrees. For example, the directional intra prediction mode may be at least one of {2, 34, 66}.

In still another example, the directional intra prediction mode may be at least one of {−14, −12, −10, −4, 2, 34, 66, 72, 76, 78, 80}.

At this time, the performing of the filtering on the reference sample may mean the applying of a 3-tap filter in the form of [1, 2, 1] on a given reference sample.

The presence of the reference sample corresponding to the directional intra prediction mode at the integer position may mean that the reference sample which is used when the intra prediction is performed using the directional intra prediction mode corresponds to an integer pixel position, not to sub-pixel position (or a real-number pixel position).

In addition, for the planer mode, that is, the non-directional mode, in addition to the directional intra prediction mode {−14, −12, −10, −6, 2, 34, 66, 72, 76, 78, 80}, reference sample filtering may also be performed on a reference sample for the current block, and then the intra prediction may be performed.

Therefore, in a case where the intra prediction mode of the current block is the planar mode or corresponds to the directional intra prediction mode {−14, −12, −10, −6, 2, 34, 66, 72, 76, 78, 80}, reference sample filtering may be performed on the reference sample for the current block and then the intra prediction may be performed using the filtered reference sample.

As another example, in a case where the intra prediction mode of the current block is neither the planar mode, nor corresponds to the directional intra prediction mode {−14, −12, −10, −6, 2, 34, 66, 72, 76, 78, 80}, the intra prediction may be performed using the reference sample on which reference sample filtering is not performed.

At this point, in a case where the intra prediction mode is the vertical mode or the horizontal mode, the reference sample present at the integer position may be used, but for the vertical mode or the horizontal mode, the intra prediction may be performed using the reference sample to which reference sample filtering is not performed.

In the embodiment described above, in a case where the reference sample that is used when the intra prediction is performed using a specific directional intra prediction mode corresponds to the subpixel position (or the real-number pixel position), when performing the intra prediction, a filtering effect on the reference sample may occur by the interpolation filter. Therefore, only in a case where the reference sample that is used when the intra prediction is performed using the specific directional intra prediction mode corresponds to the integer pixel position, reference sample filtering may be performed on the reference sample.

In addition, reference sample filtering may be performed on the reference sample, according to at least one of whether or not the reference sample that is used when the intra prediction is performed using the specific directional intra prediction mode corresponds to the integer pixel position, how many pixels are present within the current block (how large the area of pixels is within the current block), whether or to use the first reference sample line that is most adjacent to the current block, whether or not a luma signal is present, and whether or not a mode for partitioning the current block into many subblocks and performing the encoding/decoding is present.

In a case where multiple reference sample lines are used, the interpolation filter or a weighted average may be applied to a value that is predicted by applying the interpolation filter in each reference sample line.

In the case of at least one of the horizontal and vertical modes that are the directional intra prediction modes, there may be no need for the interpolated prediction for the reference sample. In addition, because the prediction is possible only with the reference samples on the upper side or the left side, there may be no need for a process of constructing the reference samples in a one-dimensional array.

The inter-color-component intra prediction method will be described.

When performing the intra prediction of the current block, the inter-color-component intra prediction may be performed. In a case where the inter-color-component intra prediction is performed, the color component may mean at least one of a luma signal, a chroma signal, Red, Green, Blue, Y, Cb, and Cr. In a case where a first color component is predicted, prediction for the first color component may be performed using at least one or more of a second color component, a third color component, and a fourth color component, and a signal of a color component that is used for the prediction may be at least one of an original signal, a restored signal, a residual signal, and a prediction signal.

As an example, intra prediction for a color component may be performed using the restored luma component of the current block. In addition, intra prediction for a different chroma component Cr may be performed using one restored color component Cb of the current block.

As another example, whether or not the intra prediction for the color component is performed is decided on the basis of at least one of a size and a form of a current target block.

As still another example, whether or not the inter-color-component intra prediction is performed may be decided according to coding parameters of at least one or both of a correspondence block corresponding to a prediction-target block and a neighboring block of the correspondence block.

In a case where the second color component is predicted using the first color component, a size of a first color component block may be reconstructed in order that the first color component block and a second color component block are made to be the same in size. For example, in a case where a color space of a picture is YCbCr and where a ratio between color components is one of 4:2:2 and 4:2:0, inter color component blocks may differ in size, and the block may be reconstructed in order that the inter color component blocks are made to be the same in size. At this time, the block that is reconstructed may include at least one or both of a sample of a first color component correspondence block and a reference sample of the neighboring block.

As an example, in a case where the size of the first color component block and the size of the second color component block are the same, a reconstruction process may not be performed.

As another example, in a case where the size of the first color component block is larger than the size of the second color component block, the first color component may be down-sampled and thus may be reconstructed in a manner that is equal in size to the second color component block.

The down-sampling may be performed by applying an N-tap filter on one or more samples. At this point, N may be an integer that is equal to or greater than 1.

As still another example, in a case where the size of the first color component block is smaller than the size of the second color component block, the first color component block may be up-sampled and thus may be reconstructed in a manner that is equal in size to the second color component block.

In a case where the reconstruction process is performed, a filter may be applied to one or more samples. For example, the filter may be applied to one or more samples that are included in at least one or more of the first color component correspondence block, the neighboring block of the correspondence block, a second color component-target block, and a neighboring block of a target block.

In a case where the reconstruction process is performed, if at least one of a boundary of a second color component prediction-target block and a boundary of the corresponding first color component correspondence block corresponds to a boundary of at least one of a picture, a slice, a tile, a CTU, and a CU, a reference sample that is reconstructed may be selected differently for use. At this time, the number of reference sample lines on the upper side and the number of reference sample lines on the left side may be different from each other.

In a case where the reconstruction process is performed, reference sample reconstruction of the first color component may be set to differ according to at least one of the size, the form, and the coding parameter of at least one of the first color component corresponding block and the neighboring block, and the second color component-target block and the neighboring block.

A prediction parameter may be derived using at least one or both of a reference sample of the reconstructed first color component correspondence block and a reference sample of the second color component prediction-target block. The first color component and the first color component block may hereinafter mean the reconstructed first color component and the reconstructed first color component block, respectively. At this time, the number of the reference samples may be N and N may be 0 or an integer that is equal to or greater than 1.

As an example, the prediction parameter may be derived using the reference samples on the upper side and the left side of the reconstructed first color component block or second color component block.

As another example, on the basis of an intra prediction mode of the first color component correspondence block, the prediction parameter may be derived, adaptively using a reference sample of the reconstructed first color component. At this time, a reference sample of the second color component may also be used adaptively on the basis of the intra prediction mode of the first color component correspondence block.

As still another example, according to at least one of the size and the form of the first color component or second color component block, the prediction parameter may be derived, adaptively using the reference sample of the first color component, or of the second color component.

The prediction parameter may be derived using a reference sample of the reconstructed first color component block and a reference sample of the second color component block, and inter color component prediction may be performed.

As an example, the prediction parameter may be derived on the basis of at least one of correlation, an amount of change, an average value, distribution, and the like between reference samples of each color component, and may be derived, using, for example, at least one of a least square (LS) method, a least mean square (LMS)method and the like.

Figure 16:
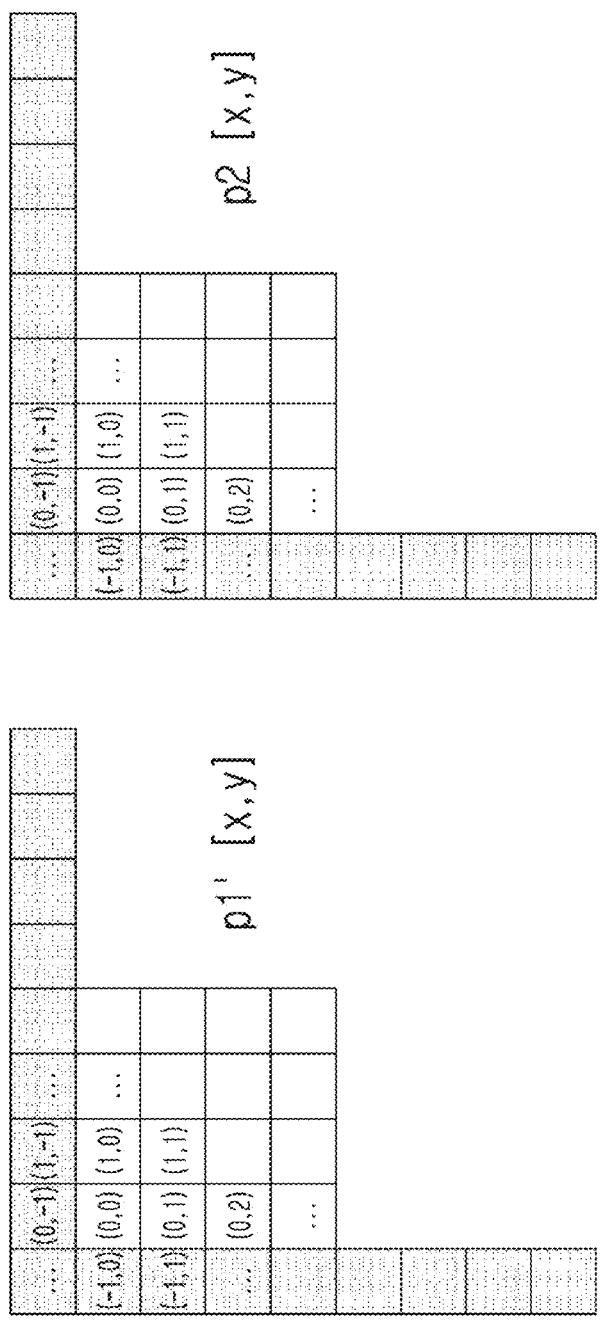
FIG. 16 is a diagram for describing a sample of a color component that is reconstructed according to an embodiment of the present invention.

As another example, the prediction parameter may be derived using the LMS method. At this time, the prediction parameter may be at least one of a, b, alpha, and beta. As in Equation 7, which is an example, a prediction parameter that minimizes an error between a first color component reference sample and a second color component reference sample may be derived. In Equation 7, $p2_n$ denotes the reference sample of the second color component, $p1'_n$ denotes the reference sample of the reconstructed first color component, N denotes the number of heights or widths of the reference samples that are used, and a and b denote the prediction parameters. At this time, As in Equation 8, which is an example, the correlation between the reference samples may be calculated. Bit Depth denotes a bit depth. As illustrated in an example in FIG. 16, p2 denotes a sample of the second color component, and p1' denotes a sample of the reconstructed first color component.

$$E(a, b) = \sum_{n=0}^{N-1} (p2_n - (a \cdot p1'_n + b))^2 \quad \text{[Equation 7]}$$

$$k = \text{Max}(0, BitDepth + \log_2(N) - 15) \quad \text{[Equation 8]}$$

$$L = \left( \sum_{y=0}^{N-1} p1'[-1, y] + \sum_{x=0}^{N-1} p1'[x, -1] \right) \gg k$$

$$C = \left( \sum_{y=0}^{N-1} p2[-1, y] + \sum_{x=0}^{N-1} p2[x, -1] \right) \gg k$$

$$LL = \left( \sum_{y=0}^{N-1} p1'[-1, y]^2 + \sum_{x=0}^{N-1} p1'[x, -1]^2 \right) \gg k$$

$$LC = \left( \sum_{y=0}^{N-1} p1'[-1, y] \times p2[-1, y] + \sum_{x=0}^{N-1} p1'[x, -1] \times p2[x, -1] \right) \gg k$$

In a case where a region where the reference sample is not present is present, the prediction parameter may be derived using only the reference sample that is present.

A basic prediction parameter (a default parameter) may be used without the prediction parameter being derived from the reference sample. At this time, the basic prediction parameter may be pre-defined. For example, a may be 1 and b may be 0. Alternatively, the derived prediction parameter may be decoded/encoded.

In a case where the inter color component prediction among Y, Cb, and Cr is performed, parameters for predicting Cb and Cr may each be derived from Y. Alternatively, a prediction parameter for predicting Cr may be derived from Cb. Alternatively, a prediction parameter that is derived from Y in order to predict Cb may be used without deriving the prediction parameter for predicting Cr.

The inter-color-component intra prediction may be performed using at least one of the derived prediction parameters.

As an example, as illustrated in an example in FIG. 9, the derived prediction parameter may be applied to the restored signal of the reconstructed first color component, and thus the prediction for the second color component-target block may be performed.

$$p2[x,y]=a \times p1'[x,y]+b \quad \text{[Equation 9]}$$

As another example, as in Equation 10, which is an example, the derived prediction parameter may be applied to a residual signal of the reconstructed first color component, and thus the prediction for the second color component-target block may be performed.

$$p2[x,y]=p2\_\text{pred}[x,y]+a \times p1'\_\text{residual}[x,y] \quad \text{[Equation 10]}$$

In Equation 10, a denotes the derived prediction parameter, and p1'_residual denotes a residual signal of the first color component. In addition, p2_pred denotes a signal that predicts the second color component-target block using at least one of the non-directional intra prediction mode and the directional intra prediction mode.

The embodiments described above may be implemented in the manner as in the encoder and the decoder.

The order of implementation of the embodiment described above differs between the encoder and the decoder. The order of implementation of the embodiment described above may be the same between the encoder and the decoder.

The embodiments of the present invention, which are described above, may be implemented according to sizes of at least one or more of a coding block, a prediction block, a block, and a unit. The size here may be defined as a minimum size and/or a maximum size for implementing the embodiments described above, and may be defined as a fixed size for implementing the embodiments described above. In addition, regarding the embodiments described above, a first embodiment may be implemented when a first size is employed and a second embodiment may be implemented where a second size is employed. That is, the embodiments described above may be implemented combinedly according to the size. In addition, the embodiments of the present invention, which are described above, may be implemented only in a case where the size is equal to or larger than a minimum size and is equal to or smaller than a maximum size. That is, the embodiments described above may be implemented in a case where the size of the block falls within a fixed range.

In addition, the embodiments of the present invention, which are described above, may be implemented only in a case where the size is equal to or larger than a minimum size and is equal to or smaller than a maximum size. At this point, each of the minimum size and the maximum size may be one of a coding block, a prediction block, a block, and a unit. That is, a block that is a minimum-sized target and a block that is a maximum-sized target may be different from each other. For example, the embodiments of the present invention, which are described above, may be implemented only in a case where the size of the current block is equal to or larger than a minimum size of the prediction block and is equal to or smaller than a maximum size of the coding block.

For example, the embodiments described above may be implemented only in a case where the size of the current block is equal to larger than 8×8. For example, the embodiments described above may be implemented only in a case where the size of the current block is equal to larger than 16×16. For example, the embodiments described above may be implemented only in a case where the size of the current block is equal to larger than 32×32. For example, the embodiments described above may be implemented only in a case where the size of the current block is equal to larger than 64×64. For example, the embodiments described above may be implemented only in a case where the size of the current block is equal to larger than 128×128. For example, the embodiments described above may be implemented only in a case where the size of the current block is 4×4. For example, the embodiments described above may be implemented only in a case where the size of the current block is equal to or smaller than is 8×8. For example, the embodiments described above may be implemented only in a case where the size of the current block is equal to or smaller than is 16×16. For example, the embodiments described above may be implemented only in a case where the size of the current block is equal to or larger than 8×8 and is equal to or smaller than 16×16. For example, the embodiments described above may be implemented only in a case where the size of the current block is equal to or larger than 16×16 and is equal to or smaller than 64×64.

The block m which the embodiments of the present invention, which are described above, are implemented, may be in the form of a square or a non-square.

For at least one of syntax elements, such as the index and the flag that are entropy-encoded in the encoder and is entropy-decoded in the decoder, at least one or more of binarization/debinarization entropy encoding/decoding methods, which are described below, may be used. The binarization/debinarization entropy encoding/decoding methods here may include at least one of a method (se(v)) for a 0-th order exponent Golomb (0-th order Exp_Golomb) binarization/debinarization that has a code, a method (sek(v)) for a k-th order exponent Golomb (k-th order Exp_Golomb) binarization/debinarization that has a code, a method (ue(v)) for a 0-th order exponent Golomb (0-th order Exp_Golomb) binarization/debinarization for a positive integer that does not have a code, a method (uek(v)) for a k-th order exponent Golomb (k-th order Exp_Golomb) binarization/debinarization for a positive integer that does not have a code, a method (f(n)) for a fixed length binarization/debinarization, a method for a truncated Rice binarization/debinarization or a method (tu(v)) for a truncated unary binarization/debinarization, a method (tb(v)) for a truncated binary binarization/debinarization, a method (ae(v)) for a context-based adaptive arithmetic truncated binary binarization/debinarization, a per-byte bit streaming b(8), a method (i(n)) for binarization/debinarization for an integer that has a code, a method (u(n)) for binarization/debinarization for a positive integer that does not has a code, and a method for unary binarization/debinarization.

It may not be assumed that, among the embodiments described above, only one embodiment limitation to which a limitation is imposed is implemented in a process of encoding/decoding the current block. A specific embodiment or at least one combination of the embodiments described above may be implemented in the process of encoding/decoding the current block.

Figure 17:
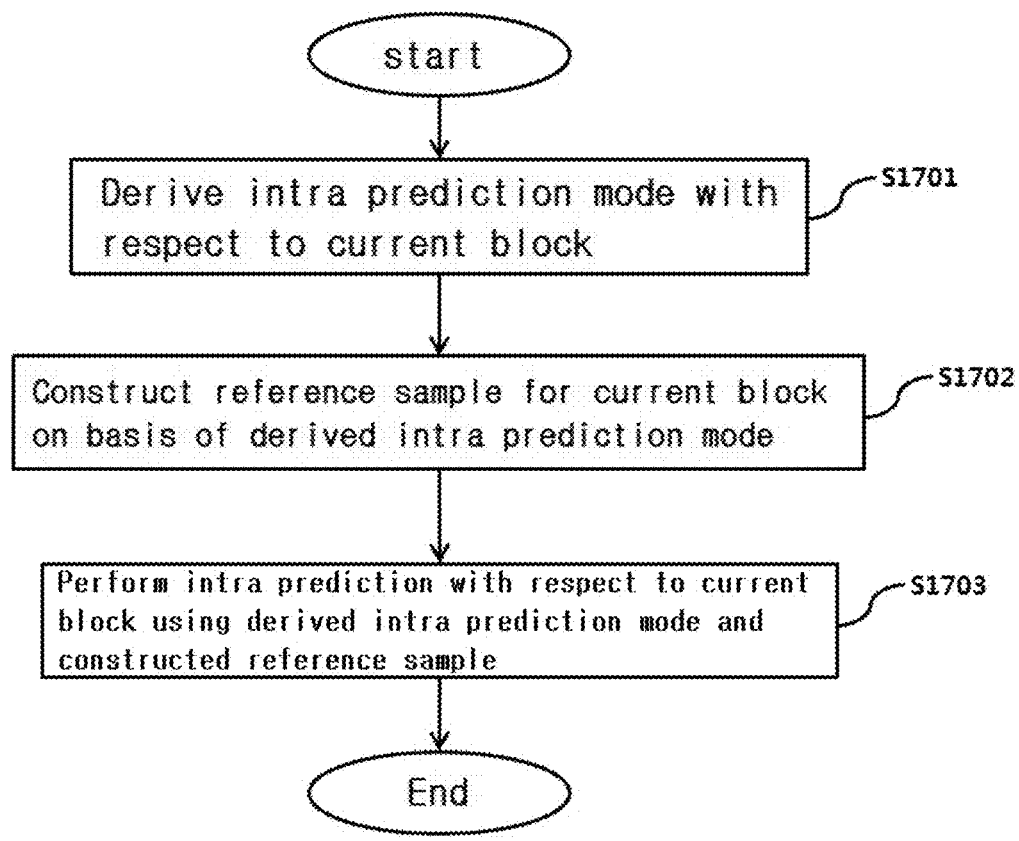
FIG. 17 is a flowchart illustrating a method of decoding the intra prediction mode according to an embodiment of the present invention.

FIG. 17 is a flowchart illustrating a method of decoding the intra prediction mode according to an embodiment of the present invention.

In Step S1701, the intra prediction mode with respect to the current block may be derived.

At this point, the intra prediction mode may be derived on the basis of a most probable mode (MPM) list.

At this point, the MPM list may include at least one of the intra prediction mode of the neighboring block, a mode that results from adding a given value to the intra prediction mode of the neighboring block, and a mode that results from subtracting a specific value from the intra prediction mode of the neighboring block. In addition, the MPM list may be constructed with five intra prediction mode candidates. The given value may be at least one of −1, +1, −2, and +2.

The neighboring block here may be at least one of a block adjacent to the left side of the current block and a block adjacent to the upper side thereof.

On the other hand, in a case where the size of the current block is W×H, the block adjacent to the upper side of the current block may mean a block to which a [W−1, −1] sample belongs.

In addition, in a case where the size of the current block is W×H the block adjacent to the left side of the current block may mean a block to which a [−1, H−1] sample belongs.

On the other hand, in a case where at least one of the intra prediction mode of the block adjacent to the left side of the current block and the intra prediction mode of the block adjacent to the upper side of the current block is the directional mode, the MPM list may be constructed with a mode other than the DC mode.

In addition, in a case where the intra prediction mode of the block adjacent to the left side of the current block and the intra prediction mode of the block adjacent to the upper side of the current block are the same and where the intra prediction mode of the block adjacent to the left side of the current block is greater than 1, the MPM list may be constructed with a first intra prediction mode of the block adjacent to the left side of the current block, a mode that is (the first intra prediction mode−1), a mode that is (the first intra prediction mode+1), a mode that is (the first intra prediction mode−2), and a mode that is (the first intra prediction mode+2).

In Step S1702, the reference sample for the current block may be constructed on the basis of the derived intra prediction mode.

At this time, in a case where the intra prediction mode with respect to the current block is the directional intra prediction mode and where the reference sample corresponding to the intra prediction mode is present at the integer position, the reference sample may be constructed by performing reference sample filtering without applying the interpolation filter.

In Step S1703, the intra prediction with respect to the current block may be performed using the derived intra prediction mode and the constructed reference sample.

Figure 18:
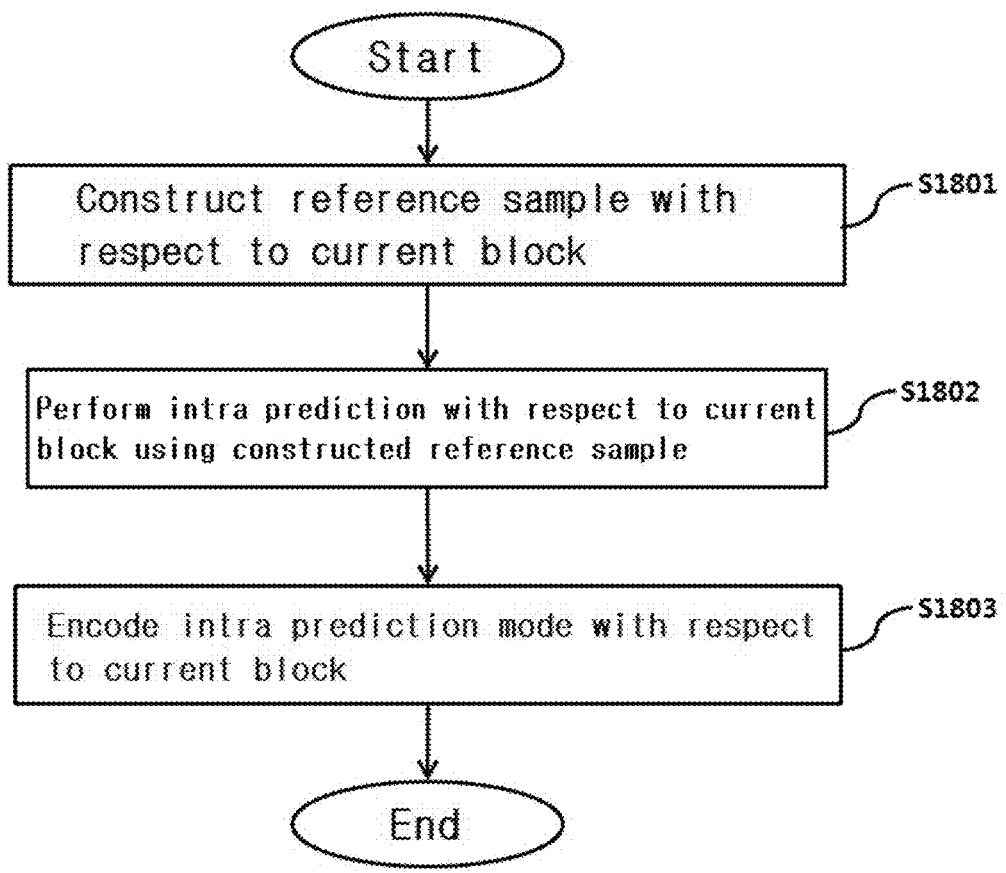
FIG. 18 is a flowchart illustrating the method of encoding the intra prediction mode according to the embodiment of the present invention.

FIG. 18 is a flowchart illustrating a method of encoding the intra prediction mode according to an embodiment of the present invention.

In Step S1801, the reference sample for the current block may be constructed.

In Step S1802, the intra prediction with respect to the current block may be performed using the constructed reference sample.

At this time, in the case where the intra prediction mode with respect to the current block is the directional intra prediction mode and where the reference sample corresponding to the intra prediction mode is present at the integer position, the reference sample may be constructed by performing reference sample filtering without applying the interpolation filter.

In Step S1803, the intra prediction mode with respect to the current block may be encoded.

At this time, the intra prediction mode may be encoded using the most probable mode (MPM) list.

The MPM list here may include at least one of the intra prediction mode of the neighboring block, the mode that results from adding a given value to the intra prediction mode of the neighboring block, and the mode that results from subtracting a specific value from the intra prediction mode of the neighboring block. In addition, the MPM list may be constructed with five intra prediction mode candidates. The given value may beat least one of −1, +1, −2, and +2.

The neighboring block here may be at least one of the block adjacent to the left side of the current block and the block adjacent to the upper side thereof.

On the other hand, in the case where the size of the current block is W×H, the block adjacent to the upper side of the current block may mean a block to which the [W−1, −1] sample belongs.

In addition, in the case where the size of the current block is W×H, the block adjacent to the left side of the current block may mean a block to which the [−1, H−1] sample belongs.

On the other hand, in the case where at least one of the intra prediction mode of the block adjacent to the left side of the current block and the intra prediction mode of the block adjacent to the upper side of the current block is the directional mode, the MPM list may be constructed with a mode other than the DC mode.

In addition, in the case where the intra prediction mode of the block adjacent to the left side of the current block and the intra prediction mode of the block adjacent to the upper side of the current block are the same and where the intra prediction mode of the block adjacent to the left side of the current block is greater than 1, the MPM list may be constructed with the first intra prediction mode of the block adjacent to the left side of the current block, the mode that is (the first intra prediction mode−1), the mode that is (the first intra prediction mode+1), the mode th is (the first intra prediction mode−2), and the mode that is (the first intra prediction mode+2).

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
    deriving an intra prediction mode of a current block based on a most probable mode (MPM) list including five intra prediction modes;
    deriving a reference sample for the current block based on the intra prediction mode; and
    predicting the current block based on the intra prediction mode and the reference sample,
    wherein the MPM list is configured to include a first intra prediction mode being equal to a left intra prediction mode,
    a second intra prediction mode which index is (2+(intra prediction mode value of the left intra prediction mode+61)%64),
    a third intra prediction mode which index is (2+(intra prediction mode value of the left intra prediction mode −1)%64),
    a fourth intra prediction mode which index is (2+(intra prediction mode value of the left intra prediction mode+60)%64), and
    a fifth intra prediction mode which index is (2 +intra prediction mode value of the left intra prediction mode %64)) based on the index of the left intra prediction mode being equal to an index of an upper intra prediction mode and being greater than 1, and
    wherein the left intra prediction mode is an intra prediction mode of a block adjacent to a left side of the current block and the upper intra prediction mode is an intra prediction mode of a block adjacent to an upper side of the current block.

2. The method according to claim 1, wherein in a case where a size of the current block is W×H, the block adjacent to the upper side of the current block is a block to which a [W−1, −1] sample belongs.

3. The method according to claim 1, wherein in a case where a size of the current block is W×H, a block adjacent to a left side of the current block is a block to which a [−1, H−1] sample belongs.

4. The method according to claim 1, wherein in a case where the intra prediction mode of the current block is a directional intra prediction mode and where a reference sample corresponding to the intra prediction mode is present at an integer position, reference sample filtering is performed without applying an interpolation filter to the reference sample.

5. A method of encoding an image, the method comprising:
    determining an intra prediction mode of a current block;
    deriving a reference sample for the current block based on the intra prediction mode;
    predicting the current block based on the reference sample; and
    encoding an intra prediction mode of the current block, wherein the intra prediction mode is encoded based on a most probable mode (MPM) list including five intra prediction modes,
    wherein the MPM list is configured to include a first intra prediction mode being equal to a left intra prediction mode, a second intra prediction mode which index is (2+(intra prediction mode value of the left intra prediction mode+61)%64), a third intra prediction mode which index is (2+(intra prediction mode value of the left intra prediction mode −1)%64), a fourth intra prediction mode which index is (2+(intra prediction mode value of the left intra prediction mode+60)%64), and a fifth intra prediction mode which index is (2+(intra prediction mode value of the left intra prediction mode %64)) based on the index of the left intra prediction mode being equal to an index of an upper intra prediction mode and being greater than 1, and
    wherein the left intra prediction mode is an intra prediction mode of a block adjacent to a left side of the current block and the upper intra prediction mode is an intra prediction mode of a block adjacent to an upper side of the current block.

6. The method according to claim 5, wherein in a case where a size of the current block is W×H, the block adjacent to the upper side of the current block is a block to which a [W−1, −1] sample belongs.

7. The method according to claim 5, wherein in a case where a size of the current block is W×H, a block adjacent to a left side of the current block is a block to which a [−1, H−1] sample belongs.

8. A computer-readable non-transitory recording medium storing image data that is decoded by a method of decoding an image,
    wherein the image data includes information on a MPM list including five intra prediction modes an intra prediction mode of a current block is derived based on MPM list, a reference sample for the current block is derived based on the intra prediction mode, and the current block is predicted based on the intra prediction mode and the reference sample,
    wherein the MPM list is configured to include a first intra prediction mode being equal to a left intra prediction mode, a second intra prediction mode which index is (2+(intra prediction mode value of the left intra prediction mode+61)%64), a third intra prediction mode which index is (2+(intra prediction mode value of the left intra prediction mode −1)%64), a fourth intra prediction mode which index is(2+(intra prediction mode value of the left intra prediction mode+60)%64), and a fifth intra prediction mode which index is (2+(intra prediction mode value of the left intra prediction mode %64))based on the index of the left intra prediction mode being equal to an index of an upper intra prediction mode and being greater than 1, and
    wherein the left intra prediction mode is an intra prediction mode of a block adjacent to a left side of the current block and the upper intra prediction mode is an intra prediction mode of a block adjacent to an upper side of the current block.

* * * * *